United States Patent
Kayanuma et al.

(10) Patent No.: US 6,861,965 B2
(45) Date of Patent: Mar. 1, 2005

(54) CODE MODULATING METHOD AND CODE MODULATING APPARATUS, DEMODULATING METHOD AND DEMODULATING APPARATUS, AND INFORMATION RECORDING MEDIUM

(75) Inventors: Kinji Kayanuma, Tokyo (JP); Toshiaki Iwanaga, Tokyo (JP); Chosaku Noda, Yokohama (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/736,785

(22) Filed: Dec. 17, 2003

(65) Prior Publication Data

US 2004/0207545 A1 Oct. 21, 2004

(30) Foreign Application Priority Data

Dec. 18, 2002 (JP) ........................................ 2002-366191
Nov. 28, 2003 (JP) ........................................ 2003-399434

(51) Int. Cl.$^7$ .............................................. H03M 7/00
(52) U.S. Cl. ............................ 341/59; 341/68; 360/41
(58) Field of Search .............................. 341/58, 59, 68, 341/69; 360/41

(56) References Cited

U.S. PATENT DOCUMENTS 6,300,886 B1 10/2001 Hayami
6,496,541 B1 12/2002 Kahlman et al.
6,653,952 B2 * 11/2003 Hayami et al. ............... 341/59
6,677,866 B2 1/2004 Kahlman et al.
2001/0017594 A1 * 8/2001 Ahn ........................... 341/59
2004/0120408 A1 6/2004 Kahlman et al.

FOREIGN PATENT DOCUMENTS

JP 10-340543 12/1998
JP 11-346154 A 12/1999
JP 2000-332613 11/2000

* cited by examiner

*Primary Examiner*—Howard L. Williams
(74) *Attorney, Agent, or Firm*—Foley & Lardner LLP

(57) ABSTRACT

In a code modulating method and a code modulating apparatus, a run length has an encoding rate of ⅔ which is equal to that of (1, 7) modulation, and indicates the number of "0" bits between adjacent ones of "1" bits in the channel bit train. A data bit train is converted into the channel bit train so that the run length has a minimum value 1 and a maximum value 10. Further, upon converting any data bit train, the channel bit train does not include a pattern "1010101010101" in which the run length 1 is continuously repeated six times or more. The channel bit train has a DSV (Digital Sum Value) control bit which selects the "0" bit or "1" bit in accordance with a DSV. The channel bit train obtained by using random data for the data bit train is NRZI converted into a signal. A frequency component of the signal is reduced from a maximum value of the frequency component by 20 dB or less as a power density at a frequency of ¹⁄₁₀,₀₀₀ or less of a channel clock frequency.

14 Claims, 15 Drawing Sheets

| DATA WORD | STATE S0 CODE WORD | STATE S0 NEXT STATE | STATE S1 CODE WORD | STATE S1 NEXT STATE | STATE S2 CODE WORD | STATE S2 NEXT STATE |
|---|---|---|---|---|---|---|
| 00 | 100010 00000* | S0 | 010100 01000* | S0 | 010100 01000* | S0 |
| 01 | 100010 00000# | S1 | 010100 010001 | S1 | 010100 010001 | S1 |
| 02 | 100010 000010 | S0 | 010100 010010 | S0 | 010100 010010 | S0 |
| 03 | 100010 000010 | S1 | 010100 010010 | S1 | 010100 010010 | S1 |
| 04 | 100010 10000* | S0 | 010100 01010* | S0 | 010100 01010* | S0 |
| 05 | 100010 10000# | S1 | 010100 010101 | S1 | 010100 010101 | S1 |
| 06 | 100010 100010 | S0 | 010100 010100 | S2 | 010100 010100 | S2 |
| 07 | 100010 100010 | S1 | 010100 010000 | S2 | 010100 010000 | S2 |
| 08 | 100010 10100* | S0 | 010100 00#00* | S0 | 010100 00#00* | S0 |
| 09 | 100010 101001 | S1 | 010100 00#001 | S1 | 010100 00#001 | S1 |
| 0A | 100010 101010 | S0 | 010100 00#010 | S0 | 010100 00#010 | S0 |
| 0B | 100010 101010 | S1 | 010100 00#010 | S1 | 010100 00#010 | S1 |
| 0C | 100010 10101* | S0 | 010100 00010* | S0 | 010100 00010* | S0 |
| 0D | 100010 100101 | S1 | 010100 000101 | S1 | 010100 000101 | S1 |
| 0E | 100010 100100 | S2 | 010100 000100 | S2 | 010100 000100 | S2 |
| 0F | 100010 101000 | S2 | 010100 001000 | S2 | 010100 001000 | S2 |
| 10 | 100010 01000* | S0 | 010000 01000* | S0 | 010000 01000* | S0 |
| 11 | 100010 010001 | S1 | 010000 010001 | S1 | 010000 010001 | S1 |
| 12 | 100010 010010 | S0 | 010000 010010 | S0 | 010000 010010 | S0 |
| 13 | 100010 010010 | S1 | 010000 010010 | S1 | 010000 010010 | S1 |
| 14 | 100010 01010* | S0 | 010000 01010* | S0 | 010000 01010* | S0 |
| 15 | 100010 010101 | S1 | 010000 010101 | S1 | 010000 010101 | S1 |
| 16 | 100010 010100 | S2 | 010000 010100 | S2 | 010000 010100 | S2 |
| 17 | 100010 010000 | S2 | 010000 010000 | S2 | 010000 010000 | S2 |
| 18 | 100010 00100* | S0 | 010000 00100* | S0 | 010000 00100* | S0 |
| 19 | 100010 001001 | S1 | 010000 001001 | S1 | 010000 001001 | S1 |
| 1A | 100010 001010 | S0 | 010000 00#010 | S0 | 010000 00#010 | S0 |
| 1B | 100010 001010 | S1 | 010000 00#010 | S1 | 010000 00#010 | S1 |
| 1C | 100010 00010* | S0 | 010000 00010* | S0 | 010000 00010* | S0 |
| 1D | 100010 000101 | S1 | 010000 000101 | S1 | 010000 000101 | S1 |
| 1E | 100010 000100 | S2 | 010000 000100 | S2 | 010000 000100 | S2 |
| 1F | 100010 001000 | S2 | 010000 001000 | S2 | 010000 001000 | S2 |
| 20 | 100001 00000* | S0 | 010101 00000* | S0 | 010101 00000* | S0 |
| 21 | 100001 00000# | S1 | 010101 00000# | S1 | 010101 00000# | S1 |
| 22 | 100001 000010 | S0 | 010101 000010 | S0 | 010101 000010 | S0 |
| 23 | 100001 000010 | S1 | 010101 000010 | S1 | 010101 000010 | S1 |
| 24 | 100000 10000* | S0 | 010100 10000* | S0 | 010100 10000* | S0 |
| 25 | 100000 10000# | S1 | 010100 10000# | S1 | 010100 10000# | S1 |
| 26 | 100000 100010 | S0 | 010100 100010 | S0 | 010100 100010 | S0 |
| 27 | 100000 100010 | S1 | 010100 100010 | S1 | 010100 100010 | S1 |
| 28 | 100000 10100* | S0 | 010100 10100* | S0 | 010100 10100* | S0 |
| 29 | 100000 101001 | S1 | 010100 101001 | S1 | 010100 101001 | S1 |
| 2A | 100000 101010 | S0 | 010100 101010 | S0 | 010100 101010 | S0 |
| 2B | 100000 101010 | S1 | 010100 101010 | S1 | 010100 101010 | S1 |
| 2C | 100000 10010* | S0 | 010100 10010* | S0 | 010100 10010* | S0 |
| 2D | 100000 100101 | S1 | 010100 100101 | S1 | 010100 100101 | S1 |
| 2E | 100000 100100 | S2 | 010100 100100 | S2 | 010100 100100 | S2 |
| 2F | 100000 101000 | S2 | 010100 101000 | S2 | 010100 101000 | S2 |
| 30 | 10000# 01000* | S0 | 010101 01000* | S0 | 010101 01000* | S0 |
| 31 | 10000# 010001 | S1 | 010101 010001 | S1 | 010101 010001 | S1 |
| 32 | 10000# 010010 | S0 | 010101 010010 | S0 | 010101 010010 | S0 |
| 33 | 10000# 010010 | S1 | 010101 010010 | S1 | 010101 010010 | S1 |
| 34 | 10000# 01010* | S0 | 010000 00000* | S0 | 010000 00000* | S0 |
| 35 | 100000 010101 | S1 | 010000 000001 | S1 | 010000 000001 | S1 |
| 36 | 10000# 010100 | S2 | 010101 010100 | S2 | 010101 010100 | S2 |
| 37 | 10000# 010000 | S2 | 010101 010000 | S2 | 010101 010000 | S2 |
| 38 | 10000# 00100* | S0 | 010101 00100* | S0 | 010101 00100* | S0 |
| 39 | 10000# 001001 | S1 | 010101 001001 | S1 | 010101 001001 | S1 |
| 3A | 10000# 001010 | S0 | 010101 001010 | S0 | 010101 001010 | S0 |
| 3B | 10000# 001010 | S1 | 010101 001010 | S1 | 010101 001010 | S1 |
| 3C | 10000# 00010* | S0 | 010101 00010* | S0 | 010101 00010* | S0 |
| 3D | 10000# 000101 | S1 | 010101 000101 | S1 | 010101 000101 | S1 |
| 3E | 10000# 000100 | S2 | 010101 000100 | S2 | 010101 000100 | S2 |
| 3F | 10000# 001000 | S2 | 010101 001000 | S2 | 010101 001000 | S2 |

FIG. 1

| DATA WORD | STATE S0 CODE WORD | STATE S0 NEXT STATE | STATE S1 CODE WORD | STATE S1 NEXT STATE | STATE S2 CODE WORD | STATE S2 NEXT STATE |
|---|---|---|---|---|---|---|
| 40 | 101010 00000* | S0 | 010010 00000* | S0 | 010010 00000* | S0 |
| 41 | 101010 00000# | S1 | 010010 00000# | S1 | 010010 00000# | S1 |
| 42 | 101010 000010 | S0 | 010010 000010 | S0 | 010010 000010 | S0 |
| 43 | 101010 000010 | S1 | 010010 000010 | S1 | 010010 000010 | S1 |
| 44 | 101010 10000* | S0 | 010010 10000* | S0 | 010010 10000* | S0 |
| 45 | 101010 10000# | S1 | 010010 10000# | S1 | 010010 10000# | S1 |
| 46 | 101010 100010 | S0 | 010010 100010 | S0 | 010010 100010 | S0 |
| 47 | 101010 100010 | S1 | 010010 100010 | S1 | 010010 100010 | S1 |
| 48 | 000000 00100* | S0 | 010010 10100* | S0 | 010010 10100* | S0 |
| 49 | 100000 000001 | S1 | 010010 101001 | S1 | 010010 101001 | S1 |
| 4A | 100000 000010 | S0 | 010010 101010 | S0 | 010010 101010 | S0 |
| 4B | 100000 000010 | S1 | 010010 101010 | S1 | 010010 101010 | S1 |
| 4C | 101010 10010* | S0 | 010010 10010* | S0 | 010010 10010* | S0 |
| 4D | 101010 100101 | S1 | 010010 100101 | S1 | 010010 100101 | S1 |
| 4E | 101010 100100 | S2 | 010010 100100 | S2 | 010010 100100 | S2 |
| 4F | 000000 001000 | S2 | 010010 101000 | S2 | 010010 101000 | S2 |
| 50 | 101010 01000* | S0 | 010010 01000* | S0 | 010010 01000* | S0 |
| 51 | 101010 010001 | S1 | 010010 010001 | S1 | 010010 010001 | S1 |
| 52 | 101010 010010 | S0 | 010010 010010 | S0 | 010010 010010 | S0 |
| 53 | 101010 010010 | S1 | 010010 010010 | S1 | 010010 010010 | S1 |
| 54 | 101010 01010* | S0 | 010010 01010* | S0 | 010010 01010* | S0 |
| 55 | 101010 010101 | S1 | 010010 010101 | S1 | 010010 010101 | S1 |
| 56 | 101010 010100 | S2 | 010010 010100 | S2 | 010010 010100 | S2 |
| 57 | 101010 010000 | S2 | 010010 010000 | S2 | 010010 010000 | S2 |
| 58 | 101010 00100* | S0 | 010010 00100* | S0 | 010010 00100* | S0 |
| 59 | 101010 001001 | S1 | 010010 001001 | S1 | 010010 001001 | S1 |
| 5A | 101010 001010 | S0 | 010010 001010 | S0 | 010010 001010 | S0 |
| 5B | 101010 001010 | S1 | 010010 001010 | S1 | 010010 001010 | S1 |
| 5C | 101010 00010* | S0 | 010010 00010* | S0 | 010010 00010* | S0 |
| 5D | 101010 000101 | S1 | 010010 000101 | S1 | 010010 000101 | S1 |
| 5E | 101010 000100 | S2 | 010010 000100 | S2 | 010010 000100 | S2 |
| 5F | 101010 001000 | S2 | 010010 001000 | S2 | 010010 001000 | S2 |
| 60 | 101001 00000* | S0 | 010001 00000* | S0 | 010001 00000* | S0 |
| 61 | 101001 00000# | S1 | 010001 000001 | S1 | 010001 000001 | S1 |
| 62 | 101001 000010 | S0 | 010001 000010 | S0 | 010001 000010 | S0 |
| 63 | 101001 000010 | S1 | 010001 000010 | S1 | 010001 000010 | S1 |
| 64 | 101000 10000* | S0 | 010000 10000* | S0 | 010000 10000* | S0 |
| 65 | 101000 10000# | S1 | 010000 10000# | S1 | 010000 10000# | S1 |
| 66 | 101000 100010 | S0 | 010000 100010 | S0 | 010000 100010 | S0 |
| 67 | 101000 100010 | S1 | 010000 100010 | S1 | 010000 100010 | S1 |
| 68 | 101000 10100* | S0 | 010000 10100* | S0 | 010000 10100* | S0 |
| 69 | 101000 101001 | S1 | 010000 101001 | S1 | 010000 101001 | S1 |
| 6A | 101000 101010 | S0 | 010000 101010 | S0 | 010000 101010 | S0 |
| 6B | 101000 101010 | S1 | 010000 101010 | S1 | 010000 101010 | S1 |
| 6C | 101000 10010* | S0 | 010000 10010* | S0 | 010000 10010* | S0 |
| 6D | 101000 100101 | S1 | 010000 100101 | S1 | 010000 100101 | S1 |
| 6E | 101000 100100 | S2 | 010000 100100 | S2 | 010000 100100 | S2 |
| 6F | 101000 101000 | S2 | 010000 101000 | S2 | 010000 101000 | S2 |
| 70 | 101001 01000* | S0 | 010001 01000* | S0 | 010001 01000* | S0 |
| 71 | 101001 010001 | S1 | 010001 010001 | S1 | 010001 010001 | S1 |
| 72 | 101001 010010 | S0 | 010001 010010 | S0 | 010001 010010 | S0 |
| 73 | 101001 010010 | S1 | 010001 010010 | S1 | 010001 010010 | S1 |
| 74 | 101001 01010* | S0 | 010001 01010* | S0 | 010001 01010* | S0 |
| 75 | 101001 010101 | S1 | 010001 000000 | S1 | 010001 000000 | S1 |
| 76 | 101001 010100 | S2 | 010001 010100 | S2 | 010001 010100 | S2 |
| 77 | 101001 010000 | S2 | 010001 010000 | S2 | 010001 010000 | S2 |
| 78 | 101001 00100* | S0 | 010001 00100* | S0 | 010001 00100* | S0 |
| 79 | 101001 001001 | S1 | 010001 001001 | S1 | 010001 001001 | S1 |
| 7A | 101001 001010 | S0 | 010001 001010 | S0 | 010001 001010 | S0 |
| 7B | 101001 001010 | S1 | 010001 001010 | S1 | 010001 001010 | S1 |
| 7C | 101001 00010* | S0 | 010001 00010* | S0 | 010001 00010* | S0 |
| 7D | 101001 000101 | S1 | 010001 000101 | S1 | 010001 000101 | S1 |
| 7E | 101001 000100 | S2 | 010001 000100 | S2 | 010001 000100 | S2 |
| 7F | 101001 001000 | S2 | 010001 001000 | S2 | 010001 001000 | S2 |

FIG. 2

| DATA WORD | STATE S0 CODE WORD | STATE S0 NEXT STATE | STATE S1 CODE WORD | STATE S1 NEXT STATE | STATE S2 CODE WORD | STATE S2 NEXT STATE |
|---|---|---|---|---|---|---|
| 80 | 100100 01000* | S0 | 000100 01000* | S0 | 000100 01000* | S0 |
| 81 | 100100 010001 | S1 | 000100 010001 | S1 | 000100 010001 | S1 |
| 82 | 100100 010010 | S0 | 000100 010010 | S0 | 000100 010010 | S0 |
| 83 | 100100 010010 | S1 | 000100 010010 | S1 | 000100 010010 | S1 |
| 84 | 100100 01010* | S0 | 000100 01010* | S0 | 000100 01010* | S0 |
| 85 | 100100 010101 | S1 | 000100 010101 | S1 | 000100 010101 | S1 |
| 86 | 100100 010100 | S2 | 000100 010100 | S2 | 000100 010100 | S2 |
| 87 | 100100 010000 | S2 | 000100 010000 | S2 | 000100 010000 | S2 |
| 88 | 100100 00#00* | S0 | 000100 00#00* | S0 | 000100 00#00* | S0 |
| 89 | 100100 00#001 | S1 | 000100 00#001 | S1 | 000100 00#001 | S1 |
| 8A | 100100 00#010 | S0 | 000100 00#010 | S0 | 000100 00#010 | S0 |
| 8B | 100100 00#010 | S1 | 000100 00#010 | S1 | 000100 00#010 | S1 |
| 8C | 100100 00010* | S0 | 000100 00010* | S0 | 000100 00010* | S0 |
| 8D | 100100 000101 | S1 | 000100 000101 | S1 | 000100 000101 | S1 |
| 8E | 100100 000100 | S2 | 000100 000100 | S2 | 000100 000100 | S2 |
| 8F | 100100 001000 | S2 | 000100 001000 | S2 | 000100 001000 | S2 |
| 90 | 101000 01000* | S0 | 001000 01000* | S0 | 001000 01000* | S0 |
| 91 | 101000 010001 | S1 | 001000 010001 | S1 | 001000 010001 | S1 |
| 92 | 101000 010010 | S0 | 001000 010010 | S0 | 001000 010010 | S0 |
| 93 | 101000 010010 | S1 | 001000 010010 | S1 | 001000 010010 | S1 |
| 94 | 101000 01010* | S0 | 001000 01010* | S0 | 001000 01010* | S0 |
| 95 | 101000 010101 | S1 | 001000 010101 | S1 | 001000 010101 | S1 |
| 96 | 101000 010100 | S2 | 001000 010100 | S2 | 001000 010100 | S2 |
| 97 | 101000 010000 | S2 | 001000 010000 | S2 | 001000 010000 | S2 |
| 98 | 101000 00#00* | S0 | 001000 00#00* | S0 | 001000 00#00* | S0 |
| 99 | 101000 00#001 | S1 | 001000 00#001 | S1 | 001000 00#001 | S1 |
| 9A | 101000 00#010 | S0 | 001000 001010 | S0 | 001000 001010 | S0 |
| 9B | 101000 00#010 | S1 | 001000 00#010 | S1 | 001000 00#010 | S1 |
| 9C | 101000 00010* | S0 | 001000 00010* | S0 | 001000 00010* | S0 |
| 9D | 101000 000101 | S1 | 001000 000101 | S1 | 001000 000101 | S1 |
| 9E | 101000 000100 | S2 | 001000 000100 | S2 | 001000 000100 | S2 |
| 5F | 101000 001000 | S2 | 001000 001000 | S2 | 001000 001000 | S2 |
| A0 | 100101 00000* | S0 | 000101 00000* | S0 | 000101 00000* | S0 |
| A1 | 100101 00000# | S1 | 000101 00000# | S1 | 000101 00000# | S1 |
| A2 | 100101 000010 | S0 | 000101 000010 | S0 | 000101 000010 | S0 |
| A3 | 100101 000010 | S1 | 000101 000010 | S1 | 000101 000010 | S1 |
| A4 | 100100 10000* | S0 | 000100 10000* | S0 | 000100 10000* | S0 |
| A5 | 100100 10000# | S1 | 000100 10000# | S1 | 000100 10000# | S1 |
| A6 | 100100 100010 | S0 | 000100 100010 | S0 | 000100 100010 | S0 |
| A7 | 100100 100010 | S1 | 000100 100010 | S1 | 000100 100010 | S1 |
| A8 | 100100 10100* | S0 | 000100 10100* | S0 | 000100 10100* | S0 |
| A9 | 100100 101001 | S1 | 000100 101001 | S1 | 000100 101001 | S1 |
| AA | 100100 101010 | S0 | 000100 101010 | S0 | 000100 101010 | S0 |
| AB | 100100 101010 | S1 | 000100 101010 | S1 | 000100 101010 | S1 |
| AC | 100100 10010* | S0 | 000100 10010* | S0 | 000100 10010* | S0 |
| AD | 100100 100101 | S1 | 000100 100101 | S1 | 000100 100101 | S1 |
| AE | 100100 100100 | S2 | 000100 100100 | S2 | 000100 100100 | S2 |
| AF | 100100 101000 | S2 | 000100 101000 | S2 | 000100 101000 | S2 |
| B0 | 100101 01000* | S0 | 000101 01000* | S0 | 000101 01000* | S0 |
| B1 | 100101 010001 | S1 | 000101 010001 | S1 | 000101 010001 | S1 |
| B2 | 100101 010010 | S0 | 000101 010010 | S0 | 000101 010010 | S0 |
| B3 | 100101 010010 | S1 | 000101 010010 | S1 | 000101 010010 | S1 |
| B4 | 100101 01010* | S0 | 000101 01010* | S0 | 000101 01010* | S0 |
| B5 | 100101 010101 | S1 | 000101 010101 | S1 | 000101 010101 | S1 |
| B6 | 100101 010100 | S2 | 000101 010100 | S2 | 000101 010100 | S2 |
| B7 | 100101 010000 | S2 | 000101 010000 | S2 | 000101 010000 | S2 |
| B8 | 100101 00100* | S0 | 000101 00100* | S0 | 000101 00100* | S0 |
| B9 | 100101 001001 | S1 | 000101 001001 | S1 | 000101 001001 | S1 |
| BA | 100101 001010 | S0 | 000101 001010 | S0 | 000101 001010 | S0 |
| BB | 100101 001010 | S1 | 000101 001010 | S1 | 000101 001010 | S1 |
| BC | 100101 00010* | S0 | 000101 00010* | S0 | 000101 00010* | S0 |
| BD | 100101 000101 | S1 | 000101 000101 | S1 | 000101 000101 | S1 |
| BE | 100101 000100 | S2 | 000101 000100 | S2 | 000101 000100 | S2 |
| BF | 100101 001000 | S2 | 000101 001000 | S2 | 000101 001000 | S2 |

FIG. 3

| DATA WORD | STATE S0 CODE WORD | STATE S0 NEXT STATE | STATE S1 CODE WORD | STATE S1 NEXT STATE | STATE S2 CODE WORD | STATE S2 NEXT STATE |
|---|---|---|---|---|---|---|
| C0 | 000010 00000* | S0 | 001010 00000* | S0 | 00#010 00000* | S0 |
| C1 | 000010 00000# | S1 | 001010 00000# | S1 | 00#010 00000# | S1 |
| C2 | 000010 000010 | S0 | 001010 000010 | S0 | 00#010 000010 | S0 |
| C3 | 000010 000010 | S1 | 001010 000010 | S1 | 00#010 000010 | S1 |
| C4 | 000010 10000* | S0 | 001010 10000* | S0 | 00#010 10000* | S0 |
| C5 | 000010 10000# | S1 | 001010 10000# | S1 | 00#010 10000# | S1 |
| C6 | 000010 100010 | S0 | 001010 100010 | S0 | 00#010 100010 | S0 |
| C7 | 000010 100010 | S1 | 001010 100010 | S1 | 00#010 100010 | S1 |
| C8 | 000010 10100* | S0 | 001010 10100* | S0 | 00#010 10100* | S0 |
| C9 | 000010 101001 | S1 | 001010 101001 | S1 | 00#010 101001 | S1 |
| CA | 000010 101010 | S0 | 001000 000010 | S0 | 001000 000010 | S0 |
| CB | 000010 101010 | S1 | 001010 101010 | S1 | 00#010 101010 | S1 |
| CC | 000010 10010* | S0 | 001010 10010* | S0 | 00#010 10010* | S0 |
| CD | 000010 100101 | S1 | 001010 100101 | S1 | 00#010 100101 | S1 |
| CE | 000010 100100 | S2 | 001010 100100 | S2 | 00#010 100100 | S2 |
| CF | 000010 101000 | S2 | 001010 101000 | S2 | 00#010 101000 | S2 |
| D0 | 000010 01000* | S0 | 001010 01000* | S0 | 00#010 01000* | S0 |
| D1 | 000010 010001 | S1 | 001010 010001 | S1 | 00#010 010001 | S1 |
| D2 | 000010 010010 | S0 | 001010 010010 | S0 | 00#010 010010 | S0 |
| D3 | 000010 010010 | S1 | 001010 010010 | S1 | 00#010 010010 | S1 |
| D4 | 000010 01010* | S0 | 001010 01010* | S0 | 00#010 01010* | S0 |
| D5 | 000010 010101 | S1 | 001010 010101 | S1 | 00#010 010101 | S1 |
| D6 | 000010 010100 | S2 | 001010 010100 | S2 | 00#010 010100 | S2 |
| D7 | 000010 010000 | S2 | 001010 010000 | S2 | 00#010 010000 | S2 |
| D8 | 000010 00100* | S0 | 001010 00100* | S0 | 00#010 00100* | S0 |
| D9 | 000010 001001 | S1 | 001010 001001 | S1 | 00#010 001001 | S1 |
| DA | 000010 001010 | S0 | 001010 001010 | S0 | 00#010 001010 | S0 |
| DB | 000010 001010 | S1 | 001010 001010 | S1 | 00#010 001010 | S1 |
| DC | 000010 00010* | S0 | 001010 00010* | S0 | 00#010 00010* | S0 |
| DD | 000010 000101 | S1 | 001010 000101 | S1 | 00#010 000101 | S1 |
| DE | 000010 000100 | S2 | 001010 000100 | S2 | 00#010 000100 | S2 |
| DF | 000010 001000 | S2 | 001010 001000 | S2 | 00#010 001000 | S2 |
| E0 | 000001 00000* | S0 | 001001 00000* | S0 | 00#001 00000* | S0 |
| E1 | 000001 00000# | S1 | 001001 00000# | S1 | 00#001 00000# | S1 |
| E2 | 000001 000010 | S0 | 001001 000010 | S0 | 00#001 000010 | S0 |
| E3 | 000001 000010 | S1 | 001001 000010 | S1 | 00#001 000010 | S1 |
| E4 | 000000 10000* | S0 | 001000 10000* | S0 | 00#000 10000* | S0 |
| E5 | 000000 10000# | S1 | 001000 10000# | S1 | 00#000 10000# | S1 |
| E6 | 000000 100010 | S0 | 001000 100010 | S0 | 00#000 100010 | S0 |
| E7 | 000000 100010 | S1 | 001000 100010 | S1 | 00#000 100010 | S1 |
| E8 | 000000 10100* | S0 | 001000 10100* | S0 | 00#000 10100* | S0 |
| E9 | 000000 101001 | S1 | 001000 101001 | S1 | 00#000 101001 | S1 |
| EA | 000000 101010 | S0 | 001000 101010 | S0 | 00#000 101010 | S0 |
| EB | 000000 101010 | S1 | 001000 101010 | S1 | 00#000 101010 | S1 |
| EC | 000000 10010* | S0 | 001000 10010* | S0 | 00#000 10010* | S0 |
| ED | 000000 100101 | S1 | 001000 100101 | S1 | 00#000 100101 | S1 |
| EE | 000000 100100 | S2 | 001000 100100 | S2 | 00#000 100100 | S2 |
| EF | 000000 101000 | S2 | 001000 101000 | S2 | 00#000 101000 | S2 |
| F0 | 00000# 01000* | S0 | 001001 01000* | S0 | 00#001 01000* | S0 |
| F1 | 00000# 010001 | S1 | 001001 010001 | S1 | 00#001 010001 | S1 |
| F2 | 00000# 010010 | S0 | 001001 010010 | S0 | 00#001 010010 | S0 |
| F3 | 00000# 010010 | S1 | 001001 010010 | S1 | 00#001 010010 | S1 |
| F4 | 00000# 01010* | S0 | 001001 01010* | S0 | 00#001 01010* | S0 |
| F5 | 000000 010101 | S1 | 001001 010101 | S1 | 001001 010101 | S1 |
| F6 | 00000# 010100 | S2 | 001001 010100 | S2 | 00#001 010100 | S2 |
| F7 | 00000# 010000 | S2 | 001001 010000 | S2 | 00#001 010000 | S2 |
| F8 | 000001 00100* | S0 | 001001 00100* | S0 | 00#001 00100* | S0 |
| F9 | 00000# 001001 | S1 | 001001 001001 | S1 | 00#001 001001 | S1 |
| FA | 00000# 001010 | S0 | 001001 001010 | S0 | 00#001 001010 | S0 |
| FB | 00000# 001010 | S1 | 001001 001010 | S1 | 00#001 001010 | S1 |
| FC | 00000# 00010* | S0 | 001001 00010* | S0 | 00#001 00010* | S0 |
| FD | 00000# 000101 | S1 | 001001 000101 | S1 | 00#001 000101 | S1 |
| FE | 00000# 000100 | S2 | 001001 000100 | S2 | 00#001 000100 | S2 |
| FF | 000001 001000 | S2 | 001001 001000 | S2 | 00#001 001000 | S2 |

FIG. 4

| INDEX | BEFORE CONCATENATION | | | AFTER CONCATENATION | | |
|---|---|---|---|---|---|---|
| | PREVIOUS CODE WORD | CURRENT CODE WORD | | PREVIOUS CODE WORD | CURRENT CODE WORD | |
| 1 | xx0101 | 010101 | 010xxx xxxxxx | xx0100 | 000000 | 010xxx xxxxxx |
| 2 | xx0101 | 010101 | 001xxx xxxxxx | xx0100 | 000000 | 001xxx xxxxxx |
| 3 | xx1001 | 010101 | 010xxx xxxxxx | xx1000 | 000000 | 010xxx xxxxxx |
| 4 | xxxxx0 | 101010 | 101010 xxxxxx | xxxxx0 | 100000 | 000010 xxxxxx |
| 5 | xxxxx1 | 001010 | 101010 xxxxxx | xxxxx1 | 000000 | 000010 xxxxxx |
| 6 | xxxxxx | xx0101 | 010101 010xxx | xxxxxx | xx0100 | 000000 010xxx |
| 7 | xxxxxx | xx0101 | 010101 001xxx | xxxxxx | xx0100 | 000000 001xxx |
| 8 | xxxxxx | xx1001 | 010101 010xxx | xxxxxx | xx1000 | 000000 010xxx |
| 9 | xxxxxx | xxxxx1 | 001010 101010 | xxxxxx | xxxxx1 | 000000 000010 |

FIG. 5A

| INDEX | BEFORE CONCATENATION | | AFTER CONCATENATION | |
|---|---|---|---|---|
| | PREVIOUS CODE WORD | CURRENT SYNCHRONIZATION PATTERN | PREVIOUS CODE WORD | CURRENT SYNCHRONIZATION PATTERN |
| 10 | xxxxx0 00000# | SY3 | xxxxx0 000001 | SY3 |

FIG. 5B

| SYNCHRONIZATION PATTERN | STATE S0 | STATE S1,S2 |
|---|---|---|
| SY0 | 1000#0 010000 000000 001001 | 0100#0 010000 000000 001001 |
| SY1 | 10100# 010000 000000 001001 | 00100# 010000 000000 001001 |
| SY2 | 10010# 010000 000000 001001 | 00010# 010000 000000 001001 |
| SY3 | 00000# 010000 000000 001001 | 00#010 010000 000000 001001 |

| INDEX | BEFORE CONCATENATION | | AFTER CONCATENATION | |
|---|---|---|---|---|
| | PREVIOUS CODE WORD / CURRENT CODE WORD | | PREVIOUS CODE WORD / CURRENT CODE WORD | |
| 1 | xxxxxx x00000 | 0000xx xxxxxx | xxxxxx x01010 | 1010xx xxxxxx |
| 2 | xxxxxx xxx000 | 000000 0xxxxx | xxxxxx xxxx01 | 010101 0xxxxx |
| 3 | xxxxxx xxxxxx | 000000 0000xx | xxxxxx xxxxxx | 001010 1010xx |

FIG. 11

| CODE WORD | DATA WORD | | | CODE WORD | DATA WORD | | | CODE WORD | DATA WORD | | |
|---|---|---|---|---|---|---|---|---|---|---|---|
| | T0 | T1 | T2 | | T0 | T1 | T2 | | T0 | T1 | T2 |
| 000000 000010 | -- | -- | CB | 000100 010100 | 84 | 86 | 86 | 001010 001010 | DA | DA | DB |
| 000000 000100 | FC | FE | FE | 000100 010101 | -- | 84 | 85 | 001010 010000 | D0 | D7 | D7 |
| 000000 000101 | -- | FC | FD | 000100 100000 | A4 | -- | A5 | 001010 010001 | -- | D0 | D1 |
| 000000 001000 | 48 | 4F | 4F | 000100 100001 | -- | A4 | A5 | 001010 010010 | D2 | D2 | D3 |
| 000000 001001 | -- | 48 | F9 | 000100 100010 | A6 | A6 | A7 | 001010 010100 | D4 | D6 | D6 |
| 000000 001010 | FA | FA | F8 | 000100 100100 | AC | AE | AE | 001010 010101 | -- | D4 | D5 |
| 000000 010000 | F0 | F7 | F7 | 000100 100101 | -- | AC | AD | 001010 100000 | C4 | -- | C5 |
| 000000 010001 | -- | F0 | F1 | 000100 101000 | A8 | AF | AF | 001010 100001 | -- | C4 | C5 |
| 000000 010010 | F2 | F2 | F3 | 000100 101001 | -- | A8 | A8 | 001010 100010 | C6 | C6 | C7 |
| 000000 010100 | F4 | F6 | F6 | 000100 101010 | AA | AA | A8 | 001010 100100 | CC | CE | CE |
| 000000 010101 | -- | F4 | F5 | 000101 000000 | A0 | -- | A1 | 001010 100101 | -- | CC | CD |
| 000000 100000 | E4 | -- | E5 | 000101 000001 | -- | A0 | A1 | 001010 101000 | CB | CF | CF |
| 000000 100001 | -- | E4 | E5 | 000101 000010 | A2 | A2 | A3 | 001010 101001 | -- | C8 | C9 |
| 000000 100010 | E6 | E6 | E7 | 000101 000100 | BC | BE | BE | 001010 101010 | -- | -- | CB |
| 000000 100100 | EC | EE | EE | 000101 000101 | -- | BC | BD | 010000 000000 | 84 | -- | -- |
| 000000 100101 | -- | EC | ED | 000101 001000 | B8 | BF | BF | 010000 000001 | -- | 34 | 35 |
| 000000 101000 | E8 | EF | EF | 000101 001001 | -- | B8 | B9 | 010000 000010 | 1A | 1A | 1B |
| 000000 101001 | -- | E8 | E9 | 000101 001010 | BA | BA | B8 | 010000 000100 | 1C | 1E | 1E |
| 000000 101010 | EA | EA | EB | 000101 010000 | B0 | B7 | B7 | 010000 000101 | -- | 1C | 1D |
| 000001 000000 | E0 | -- | E1 | 000101 010001 | -- | B0 | B1 | 010000 001000 | 18 | 1F | 1F |
| 000001 000001 | -- | E0 | E1 | 000101 010010 | B2 | B2 | B3 | 010000 001001 | -- | 18 | 19 |
| 000001 000010 | E2 | E2 | E3 | 000101 010100 | B4 | B6 | B6 | 010000 001010 | 1A | 1A | 1B |
| 000001 000100 | FC | FE | FE | 000101 010101 | -- | B4 | B5 | 010000 010000 | 10 | 17 | 17 |
| 000001 000101 | -- | FC | FD | 001000 000000 | 98 | -- | F5 | 010000 010001 | -- | 10 | 11 |
| 000001 001000 | F8 | FF | FF | 001000 000001 | -- | 98 | 99 | 010000 010010 | 12 | 12 | 13 |
| 000001 001001 | -- | F8 | F9 | 001000 000010 | CA | CA | 9B | 010000 010100 | 14 | 16 | 16 |
| 000001 001010 | FA | FA | FB | 001000 000100 | 9C | 9E | 9E | 010000 010101 | -- | 14 | 15 |
| 000001 010000 | F0 | F7 | F7 | 001000 000101 | -- | 9C | 9D | 010000 100000 | 64 | -- | 65 |
| 000001 010001 | -- | F0 | F1 | 001000 001000 | 98 | 9F | 9F | 010000 100001 | -- | 64 | 65 |
| 000001 010010 | F2 | F2 | F3 | 001000 001001 | -- | 98 | 99 | 010000 100010 | 66 | 66 | 67 |
| 000001 010100 | F4 | F6 | F6 | 001000 001010 | 9A | 9A | 9B | 010000 100100 | 6C | 6E | 6E |
| 000001 010101 | -- | F4 | -- | 001000 010000 | 90 | 97 | 97 | 010000 100101 | -- | 6C | 6D |
| 000010 000000 | C0 | -- | C1 | 001000 010001 | -- | 90 | 91 | 010000 101000 | 68 | 6F | 6F |
| 000010 000001 | -- | C0 | C1 | 001000 010010 | 92 | 92 | 93 | 010000 101001 | -- | 68 | 69 |
| 000010 000010 | C2 | C2 | C3 | 001000 010100 | 94 | 96 | 96 | 010000 101010 | 6A | 6A | 6B |
| 000010 000010 | DC | DE | DE | 001000 010101 | -- | 94 | 95 | 010001 000000 | 60 | -- | 75 |
| 000010 000101 | -- | DC | DD | 001000 100000 | E4 | -- | E5 | 010001 000001 | -- | 60 | 61 |
| 000010 001001 | D8 | DF | DF | 001000 100001 | -- | E4 | E5 | 010001 000010 | 62 | 62 | 63 |
| 000010 001001 | -- | D8 | D9 | 001000 100010 | E6 | E6 | E7 | 010001 000100 | 7C | 7E | 7E |
| 000010 001010 | DA | DA | DB | 001000 100100 | EC | EE | EE | 010001 000101 | -- | 7C | 7D |
| 000010 010000 | D0 | D7 | D7 | 001000 100101 | -- | EC | ED | 010001 001000 | 78 | 7F | 7F |
| 000010 010001 | -- | D0 | D1 | 001000 101000 | E8 | EF | EF | 010001 001001 | -- | 78 | 79 |
| 000010 010010 | D2 | D2 | D3 | 001000 101001 | -- | E8 | E9 | 010001 001010 | 7A | 7A | 7B |
| 000010 010100 | D4 | D6 | D6 | 001000 101010 | EA | EA | EB | 010001 010000 | 70 | 77 | 77 |
| 000010 010101 | -- | D4 | D5 | 001001 000000 | E0 | -- | E1 | 010001 010001 | -- | 70 | 71 |
| 000010 100000 | C4 | -- | C5 | 001001 000001 | -- | E0 | E1 | 010001 010010 | 72 | 72 | 73 |
| 000010 100001 | -- | C4 | C5 | 001001 000010 | E2 | F2 | E3 | 010001 010100 | 74 | 76 | 76 |
| 000010 100010 | C6 | C6 | C7 | 001001 000100 | FC | FE | FE | 010001 010101 | -- | 74 | -- |
| 000010 100100 | CC | CE | CE | 001001 000101 | -- | FC | FD | 010010 000000 | 40 | -- | 41 |
| 000010 100101 | -- | CC | CD | 001001 001000 | F8 | FF | FF | 010010 000001 | -- | 40 | 41 |
| 000010 101000 | C8 | CF | CF | 001001 001001 | -- | F8 | F9 | 010010 000010 | 42 | 42 | 43 |
| 000010 101001 | -- | C8 | C9 | 001001 001010 | FA | FA | FB | 010010 000100 | 50 | 5E | 5E |
| 000010 101010 | CA | CA | CB | 001001 010000 | F0 | F7 | F7 | 010010 000101 | -- | 5C | 5D |
| 000100 000000 | 88 | -- | B5 | 001001 010001 | -- | F0 | F1 | 010010 001000 | 58 | 5F | 5F |
| 000100 000001 | -- | 88 | 89 | 001001 010010 | F2 | F2 | F3 | 010010 001001 | -- | 58 | 59 |
| 000100 000010 | 8A | 8A | 8B | 001001 010100 | F4 | F6 | F6 | 010010 001010 | 5A | 5A | 5B |
| 000100 000100 | 8C | 8E | 8E | 001001 010101 | -- | F4 | F5 | 010010 010000 | 50 | 57 | 57 |
| 000100 000101 | -- | 8C | 8D | 001010 000000 | C0 | -- | C1 | 010010 010001 | -- | 50 | 51 |
| 000100 001000 | 88 | 8F | 8F | 001010 000001 | -- | C0 | C1 | 010010 010010 | 52 | 52 | 53 |
| 000100 001001 | -- | 88 | 89 | 001010 000010 | C2 | C2 | C3 | 010010 010100 | 54 | 56 | 56 |
| 000100 001010 | 8A | 8A | 8B | 001010 000100 | DC | DE | DE | 010010 010101 | -- | 54 | 55 |
| 000100 010000 | 80 | 87 | 87 | 001010 000101 | -- | DC | DD | 010010 100000 | 44 | -- | 45 |
| 000100 010001 | -- | 80 | 81 | 001010 001000 | D8 | DF | DF | 010010 100001 | -- | 44 | 45 |
| 000100 010010 | 82 | 82 | 83 | 001010 001001 | -- | D8 | D9 | 010010 100010 | 46 | 46 | 47 |

FIG. 12

| CODE WORD | DATA WORD T0 | T1 | T2 | CODE WORD | DATA WORD T0 | T1 | T2 | CODE WORD | DATA WORD T0 | T1 | T2 |
|---|---|---|---|---|---|---|---|---|---|---|---|
| 010010 100100 | 4C | 4E | 4E | 100001 001001 | -- | 38 | 39 | 101000 000010 | 9A | 9A | 9B |
| 010010 100101 | -- | 4C | 4D | 100001 001010 | 3A | 3A | 3B | 101000 000100 | 9C | 9E | 9E |
| 010010 101000 | 48 | 4F | 4F | 100001 010000 | 30 | 37 | 37 | 101000 000101 | -- | 9C | 9D |
| 010010 101001 | -- | 48 | 49 | 100001 010001 | -- | 30 | 31 | 101000 001000 | 98 | 9F | 9F |
| 010010 101010 | 4A | 4A | 4B | 100001 010010 | 32 | 32 | 33 | 101000 001001 | -- | 98 | 99 |
| 010100 000000 | 08 | -- | -- | 100001 010100 | 34 | 36 | 36 | 101000 001010 | 9A | 9A | 9B |
| 010100 000001 | -- | 08 | 09 | 100001 010101 | -- | 34 | -- | 101000 010000 | 90 | 97 | 97 |
| 010100 000010 | 0A | 0A | 0B | 100010 000000 | 00 | -- | 01 | 101000 010001 | -- | 90 | 91 |
| 010100 000100 | 0C | 0E | 0E | 100010 000001 | -- | 00 | 01 | 101000 010010 | 92 | 92 | 93 |
| 010100 000101 | -- | 0C | 0D | 100010 000010 | 02 | 02 | 03 | 101000 010100 | 94 | 96 | 96 |
| 010100 001000 | 08 | 0F | 0F | 100010 000100 | 1C | 1E | 1E | 101000 010101 | -- | 94 | 95 |
| 010100 001001 | -- | 08 | 09 | 100010 000101 | -- | 1C | 1D | 101000 100000 | 64 | -- | 65 |
| 010100 001010 | 0A | 0A | 0B | 100010 001000 | 18 | 1F | 1F | 101000 100001 | -- | 64 | 65 |
| 010100 010000 | 00 | 07 | 07 | 100010 001001 | -- | 18 | 19 | 101000 100010 | 66 | 66 | 67 |
| 010100 010001 | -- | 00 | 01 | 100010 001010 | 1A | 1A | 1B | 101000 100100 | 6C | 6E | 6E |
| 010100 010010 | 02 | 02 | 03 | 100010 010000 | 10 | 17 | 17 | 101000 100101 | -- | 6C | 6D |
| 010100 010100 | 04 | 06 | 06 | 100010 010001 | -- | 10 | 11 | 101000 101000 | 68 | 6F | 6F |
| 010100 010101 | -- | 04 | 05 | 100010 010010 | 12 | 12 | 13 | 101000 101001 | -- | 68 | 69 |
| 010100 100000 | 24 | -- | 25 | 100010 010100 | 14 | 16 | 16 | 101000 101010 | 6A | 6A | 6B |
| 010100 100001 | -- | 24 | 25 | 100010 010101 | -- | 14 | 15 | 101001 000000 | 60 | -- | 61 |
| 010100 100010 | 26 | 26 | 27 | 100010 100000 | 04 | -- | 05 | 101001 000001 | -- | 60 | 61 |
| 010100 100100 | 2C | 2E | 2E | 100010 100001 | -- | 04 | 05 | 101001 000010 | 62 | 62 | 63 |
| 010100 100101 | -- | 2C | 2D | 100010 100010 | 06 | 06 | 07 | 101001 000100 | 7C | 7E | 7E |
| 010100 101000 | 28 | 2E | 2F | 100010 100100 | 0C | 0E | 0E | 101001 000101 | -- | 7C | 7D |
| 010100 101001 | -- | 28 | 29 | 100010 100101 | -- | 0C | 0D | 101001 001000 | 78 | 7F | 7F |
| 010100 101010 | 2A | 2A | 2B | 100010 101000 | 08 | 0F | 0F | 101001 001001 | -- | 78 | 79 |
| 010101 000000 | 20 | -- | 21 | 100010 101001 | -- | 08 | 09 | 101001 001010 | 7A | 7A | 7B |
| 010101 000001 | -- | 20 | 21 | 100010 101010 | 0A | 0A | 0B | 101001 010000 | 70 | 77 | 77 |
| 010101 000010 | 22 | 22 | 23 | 100100 000000 | 88 | -- | B5 | 101001 010001 | -- | 70 | 71 |
| 010101 000100 | 3C | 3E | 3E | 100100 000001 | -- | 88 | 89 | 101001 010010 | 72 | 72 | 73 |
| 010101 000101 | -- | 3C | 3D | 100100 000010 | 8A | 8A | 8B | 101001 010100 | 74 | 76 | 76 |
| 010101 001000 | 38 | 3F | 3F | 100100 000100 | 8C | 8E | 8E | 101001 010101 | -- | 74 | 75 |
| 010101 001001 | -- | 38 | 39 | 100100 000101 | -- | 8C | 8D | 101010 000000 | 40 | -- | 41 |
| 010101 001010 | 3A | 3A | 3B | 100100 001000 | 88 | 8F | 8F | 101010 000001 | -- | 40 | 41 |
| 010101 010000 | 30 | 37 | 37 | 100100 001001 | -- | 88 | 89 | 101010 000010 | 42 | 42 | 43 |
| 010101 010001 | -- | 30 | 31 | 100100 001010 | 8A | 8A | 8B | 101010 000100 | 5C | 5E | 5E |
| 010101 010010 | 32 | 32 | 33 | 100100 010000 | 80 | 87 | 87 | 101010 000101 | -- | 5C | 5D |
| 010101 010100 | -- | 36 | 36 | 100100 010001 | -- | 80 | 81 | 101010 001000 | 58 | 5F | 5F |
| 100000 000001 | -- | -- | 49 | 100100 010010 | 82 | 82 | 83 | 101010 001001 | -- | 58 | 59 |
| 100000 000010 | 4A | 4A | 4B | 100100 010100 | 84 | 86 | 86 | 101010 001010 | 5A | 5A | 5B |
| 100000 000100 | 3C | 3E | 3E | 100100 010101 | -- | 84 | 85 | 101010 010000 | 50 | 57 | 57 |
| 100000 000101 | -- | 3C | 3D | 100100 100000 | A4 | -- | A5 | 101010 010001 | -- | 50 | 51 |
| 100000 001000 | 38 | 3F | 3F | 100100 100001 | -- | A4 | A5 | 101010 010010 | 52 | 52 | 53 |
| 100000 001001 | -- | 38 | 39 | 100100 100010 | A6 | A6 | A7 | 101010 010100 | 54 | 56 | 56 |
| 100000 001010 | 3A | 3A | 3B | 100100 100100 | AC | AE | AE | 101010 010101 | -- | 54 | 55 |
| 100000 010000 | 30 | 37 | 37 | 100100 100101 | -- | AC | AD | 101010 100000 | 44 | -- | 45 |
| 100000 010001 | -- | 30 | 30 | 100100 101000 | AB | AF | AF | 101010 100001 | -- | 44 | 45 |
| 100000 010010 | 32 | 32 | 33 | 100100 101001 | -- | A8 | A9 | 101010 100010 | 46 | 46 | 47 |
| 100000 010100 | 34 | 36 | 36 | 100100 101010 | AA | AA | AB | 101010 100100 | 4C | 4E | 4E |
| 100000 010101 | -- | 34 | 35 | 100101 000000 | A0 | -- | A1 | 101010 100101 | -- | 4C | 4D |
| 100000 100000 | 24 | -- | 25 | 100101 000001 | -- | A0 | A1 | | | | |
| 100000 100001 | -- | 24 | 25 | 100101 000010 | A2 | A2 | A3 | | | | |
| 100000 100010 | 26 | 26 | 27 | 100101 000100 | BC | BE | BE | | | | |
| 100000 100100 | 2C | 2E | 2E | 100101 000101 | -- | BC | BD | | | | |
| 100000 100101 | -- | 2C | 2D | 100101 001000 | B8 | BF | BF | | | | |
| 100000 101000 | 28 | 2F | 2F | 100101 001001 | -- | B8 | B9 | | | | |
| 100000 101001 | -- | 28 | 29 | 100101 001010 | BA | BA | BB | | | | |
| 100000 101010 | 2A | 2A | 2B | 100101 010000 | B0 | B7 | B7 | | | | |
| 100001 000000 | 20 | -- | 21 | 100101 010001 | -- | B0 | B1 | | | | |
| 100001 000001 | -- | 20 | 21 | 100101 010010 | B2 | B2 | B3 | | | | |
| 100001 000010 | 22 | 22 | 23 | 100101 010100 | B4 | B6 | B6 | | | | |
| 100001 000100 | 3C | 3E | 3E | 100101 010101 | -- | B4 | B5 | | | | |
| 100001 000101 | -- | 3C | 3D | 101000 001000 | 98 | -- | 75 | | | | |
| 100001 001000 | 38 | 3F | 3F | 101000 000001 | -- | 98 | 99 | | | | |

FIG. 13

| PREVIOUS CHANNEL BIT | DATA BITS | FOLLOWING DATA BITS | CHANNEL BITS |
|---|---|---|---|
| x | 00 | 0x | 001 |
| 0 | 00 | 1x | 000 |
| 1 | 00 | 1x | 010 |
| 0 | 01 | 0x | 001 |
| 0 | 01 | 1x | 000 |
| 1 | 01 | 00 | 010 |
| 1 | 01 | 01 | 000 |
| 1 | 01 | 1x | 000 |
| 0 | 10 | 0x | 101 |
| 0 | 10 | 1x | 010 |
| 0 | 11 | 00 | 010 |
| 0 | 11 | 01 | 100 |
| 0 | 11 | 1x | 100 |

CODE MODULATING METHOD AND CODE MODULATING APPARATUS, DEMODULATING METHOD AND DEMODULATING APPARATUS, AND INFORMATION RECORDING MEDIUM

BACKGROUND OF THE INVENTION

1. Field of the Invention

The present invention relates to a code modulating method and a code modulating apparatus, a demodulating method and a demodulating apparatus, and an information recording medium, all of which are used for recording or reproducing digital data on a recording medium, such as an optical disk.

2. Description of the Related Art

On recording data on a recording medium, such as an optical disk, data modulation is carried out so as to be matched with the recording medium. On recordation or reproduction of data on or from the recording medium, DC components included in signals or codes recorded or reproduced are liable to cause fluctuation of a servo control signal of a disk device to occur, or to cause jitters to occur. Therefore, it is preferable that modulation signal or codes include no DC components, if possible.

A DVD (Digital Versatile Disc) uses eight to sixteen (8/16) modulation which modulates an 8-bit data bit train into a 16-bit data bit train in accordance with a run length limiting RLL (2, 10) rule. Herein, it is to be noted that the RLL (2, 10) converts a data bit train into a channel bit train which includes, between adjacent ones of "1" bits, "0" bits not smaller than two (2) and not greater than ten (10). Specifically, numeral "2" in the RLL (2, 10) rule denotes the minimum number of continuous "0" bits between the adjacent "1" bits (also referred to as a minimum run length). On the other hand, numeral "10" denotes the maximum number of continuous "0" bits between the adjacent "1" bits (also referred to as a maximum run length). Further, the 8/16 modulation is helpful to suppress the DC component by selecting a code word from a plurality of tables based on a DSV (Digital Sum Value). The DSV is defined in connection with the channel bit train after NRZI conversion and denotes a total sum of "+1" obtained by successively adding +1 and −1 on occurrence of "1" and "0", respectively, from a leading bit of the channel bit train. The DSV serves to indicate a level of the DC components included in the channel bit train. In the 8/16 modulation, a code word is selected from the plurality of preset tables so that the DSV becomes minimum and, thus, the fluctuation due to the DC components in the channel bit train can be suppressed.

As mentioned above, in the 8/16 modulation, the data bit train is separated into each data word of an 8-bit unit, and is converted into a code word of 16 channel bits. An encoding rate indicated by a rate of the data bits to the channel bits is equal to ½. A high encoding rate implies that a long time can be available for detection of each channel bit. As a consequence, the encoding rate is preferably high.

Known in the art is another code that is defined in accordance with an RLL rule for an optical disk or a magnetic disk, that has the encoding rate of ⅔ which is higher than that of the 8/16 modulation, and that is obtained by ⅔ modulation. More specifically, in the ⅔ modulation, 2 data bits are modulated into 3 channel bits under an RLL (1, 7) rule in which the run length of "0" is equal to one or more and seven or less. In other words, the minimum run length of "0" is "1" and the maximum run length of "0" is "7". FIG.

2

15 shows a code conversion table for the ⅔ modulation in the typical RLL (1, 7). In the code conversion table shown in FIG. 15, 3 channel bits are obtained by referring to 2 data bits as a modulation target together with a succeeding or subsequent data bit and an end bit of precedent channel bits. In FIG. 15, reference symbol "x" is indicated in the subsequent data bit and the precedent channel bit and may have the "0" bit or "1" bit. In the ⅔ modulation based on the RLL (1, 7), the data bit train is converted into the channel bit train containing "0" bits that are not smaller than one and not greater than seven between the adjacent ones of "1" bits. Therefore, in the NRZI recording, a mark or space is limited to 2T or more and 8T or less (herein, reference symbol T denotes a channel bit length). Japanese Unexamined Patent Publication Nos. 10-340543 (patent document 1) and 2000-332613 (patent document 2) suggest a method for encoding the data bit train into the channel bit train under the above-mentioned RLL (1, 7) rule.

Herein, it has been pointed out that, in a reproduction signal recorded with a high density in a disk, detection of the channel bit becomes difficult because a signal amplitude becomes small due to a short pattern of mark and space lengths. A detecting window width standardized by the data bit length is as narrow as ½ in the case of the 8/16 modulation and is widened to ⅔ in the case of the (1, 7) modulation. However, the shortest mark length or space length is as long as 3/2 in the case of the 8/16 modulation and is as short as 4/3 in the case of the (1, 7) modulation. Such a reduction in the shortest mark length or space length brings about an amplitude reduction of the reproduction signal recorded with the shortest mark or space in a recording portion and reproduced from the recording portion. The reduction of the amplitude is liable to increase jitters due to noises when a reproduction signal is converted into binary data by the use of a comparator. The above-mentioned problem which results from continuous occurrence of the minimum run length has been pointed out in Japanese Unexamined Patent Application Publication No. 11-346154 (patent document 3).

However, when either the shortest mark length or space length alone is shortened, a reduction in amplitude can be compensated by using PRML (Partial Response Maximum Likelihood) detection so as to process the reproduction signal. In the PRML detection, a reproduction waveform is compared with a candidate waveform obtained from a plurality of candidates of the channel bit trains, and selection is made about the channel bit train which corresponds to the candidate waveform which is most likely to be the reproduction waveform. According to this detection, even when candidate waveforms partially include a pattern such that a signal amplitude is reduced and the signal amplitudes of the remaining candidate waveforms are large, detection errors can be decreased, on the assumption that the former candidate waveforms and the latter candidate waveforms may be distinguished from each other.

The modulating method for the ⅔ modulation defined in accordance with the RLL (1, 7) described in the related art has an excellent feature that the encoding rate is as high as ⅔ and the detecting window width can be widened. However, in the channel bit train under the RLL (1, 7) modulation, the run length of "1" appears with a high probability and, as a result, the shortest pattern of the 2T pattern is liable to continuously occur (where reference symbol T indicates the channel bit length). The above-mentioned shortest pattern corresponds to the shortest mark or the shortest space in the NRZI recording. In the PRML detection, a detection error therefore frequently occurs in the reproduction signal which includes continuous patterns of 2T. Using the PRML detection makes it possible to distinguish the reproduction waveform with the 2T patterns, from the reproduction waveform with the 3T or more patterns. However, in the portion which has the continuous patterns of 2T, it is difficult to specify the phase of the channel bit train only on the basis of the reproduction waveform in the above-mentioned portion.

In the PRML detection, the channel bit train arranged in the portion with the continuous patterns of 2T is specified by referring to information obtained from the reproduction waveform located or arranged before/after each continuous pattern. Mixture of the noise in the reproduction waveform tends to cause a detection error to occur in the case where detection is made in the state of shifting a whole of continuous patterns of 2T by one channel bit length of T in a long continuous portion of 2T. In this event, a detection error is spread over an entire detected range shifted by one channel bit and lasts for a plurality of bytes.

In the reproduction signal having the long continuous patterns of 2T, namely, the minimum run length 1, a low signal amplitude state is continued for a long time. This makes it difficult to extract a channel clock from the reproduction signal. Continuation of the 2T patterns is also not preferable in view of instability in the extraction of the channel clock. Each of the patent documents 1 and 2 discloses the encoding method under the RLL (1, 7) rule. Further, each of the patent documents 1 and 2 discloses a technology that the redundancy is reduced and the DSV is controlled under the RLL rule. However, no teaching is made at all about the problems caused by the continuous state of the minimum run length 1 and its solving means. Furthermore, the patent document 3 discloses that the continuous state of the minimum run length is restricted to a predetermined number of times by using a converting table having a converting section. However, the patent document 3 is directed only to using a variable length code but never considers any encoding rate.

In addition, it is disadvantageous on reproducing, from the disk, the signal recorded by using the (1, 7) modulation a low frequency component is included in the reproduction signal. Further, the low frequency component in the reproduction signal undesirably varies a servo control signal for controlling a disk device.

SUMMARY OF THE INVENTION

Accordingly, it is an object of the present invention to provide a code modulating method and a code modulating apparatus for obtaining a modulating code which has an encoding rate equal to that of (1, 7) modulation. This method prevents or prohibits the existence of a pattern which is liable to bring about a detecting error of a reproduction signal in a channel bit train and is suitable for high-density recording with DC components reduced.

It is another object of the present invention to provide a demodulating method and a demodulating apparatus for reading the above code, and an information recording medium which records data by using the code and prevents or prohibits the occurrence of the detection error.

In order to solve the above problems, according to the present invention, in a code modulating method and a code modulating apparatus, a run length has the same encoding rate of $2/3$ as that of (1, 7) modulation, and indicates the number of "0" bits sandwiched by "1" bits in the channel bit train. A data bit train is converted into the channel bit train so that the run length has a minimum value as 1 and a maximum value as 10. Further, upon converting any data bit train, the channel bit train does not include a pattern "1010101010101" such that the run length 1 is continuously repeated six times or more.

Moreover, the channel bit train has a DSV control bit for selecting a "0" bit or "1" bit in accordance with a DSV (Digital Sum Value). A frequency component of a signal is obtained by NRZI conversion of the channel bit train as a result of selecting a value of the DSV control bit in accordance with the DSV and using random data for the data bit train, and it is reduced from a maximum value of the frequency component by 20 dB or more as an power density at a frequency of $1/10,000$ or less of a channel clock frequency.

In addition, according to the present invention, a demodulating method comprises the steps of detecting a pattern replaced under a replacing rule upon concatenating code words before separating the channel bit train every code word, replacing the detected pattern with a pattern before the replacement, and separating the pattern into the code words containing the channel bit train having 12 bits, with a plurality of demodulation tables which store a data word containing a data bit train having 8 bits, corresponding to the code word containing the channel bit train having the 12 bits, selecting the demodulation table for demodulating the separated code words based on information indicating the subsequent code word having the 12 channel bits, and obtaining the data word containing the data bit train having the 8 bits by using information indicating the code word having the 12 channel bits and the selected demodulation table.

In addition, according to the present invention, a demodulating apparatus comprises a plurality of demodulation tables for storing a data word containing a data bit train of 8 bits corresponding to the code word containing the channel bit train of 12 bits, means which detects an inserted synchronization pattern from the channel bit train, means which further detects a pattern replaced under a replacing rule upon connecting the code words before separating the channel bit train every code word, replaces the detected pattern with a pattern before the replacement, and separates the pattern into the code word containing the channel bit train having the 12 bits, means which selects the demodulation table for demodulating the separated code word based on information indicating the subsequent code word having the 12 channel bits, and means which obtains the data word containing the data bit train having the 8 bits by using information indicating the code word having the 12 channel bits and the selected demodulation table.

In addition, an information recording medium according to the present invention is for use in recording information that is obtained by NRZI conversion of a channel bit train and that is made to correspond to a pit length and a pit interval. In the recording medium, the information is recorded so that a run length in the channel bit train has a minimum value 1 and a maximum value 10 except for a synchronization pattern inserted at a predetermined period, the appearance of a pattern such that the run length 1 which is continuously repeated six times or more is prohibited in the channel bit train, a frequency component of a signal recorded from a pit having an power density which is reduced from a maximum value of the frequency component by 20 dB or less at a frequency of $1/10,000$ or less of a channel clock frequency.

According to the present invention, it is possible to provide a code modulating method and a code modulating apparatus for obtaining a modulating code which has an encoding rate equal to that of (1, 7) modulation, prevents the existence of a pattern facilitating a detecting error of a reproduction signal in a channel bit train, and is suitable to high-density recording having low DC components. In addition, a demodulating method and a demodulating apparatus according to the present invention is for use in reading the above code and an information recording medium records data by using the code and prevents the occurrence of the detecting error. Specifically, a channel bit train according to the present invention has an encoding rate of 2/3, a minimum value of the run length 1, a maximum value 10, and the repeat times of the run length 1 not greater than five times. Further, the channel bit train has a sufficiently low frequency component and is suitable to the high-density recording. In view of the boundary of the code word, advantageously, the influence over three bytes is prevented. Furthermore, the encoding rate is 2/3 and the amplitude strength is lower than a maximum value thereof by 20 dB at the frequency of 1/10,000 or less of the channel clock frequency. On the contrary, in the demodulation, the data is processed based on the code word unit of 12 channel bits. Further, the code word just after/before it may be referred to and the circuit structure is realized without propagating the detecting error. In addition, advantageously, the channel clock is stably extracted even with high recording density, and the detecting error does not occur.

BRIEF DESCRIPTION OF THE DRAWINGS

FIG. 1 is a table showing one part of a code conversion table for a modulating method according to the present invention;

FIG. 2 is a diagram showing another part of the code conversion table for the modulating method according to the present invention;

FIG. 3 is a diagram showing another part of the code conversion table for the modulating method according to the present invention;

FIG. 4 is a diagram showing another part of the code conversion table for the modulating method according to the present invention;

FIG. 5A is a diagram showing one replacing rule for the modulating method according to the present invention;

FIG. 5B is a diagram showing another replacing rule for the modulating method according to the present invention;

FIG. 11 is a diagram showing a separation rule for the demodulating method according to the present invention;

FIG. 12 is a diagram showing one part of a demodulation table for the demodulating method according to the present invention;

FIG. 13 is a diagram showing another part of the demodulation table for the demodulating method according to the present invention;

FIG. 15 is a diagram showing a code conversion table for a well-known modulating method.

DESCRIPTION OF THE PREFERRED EMBODIMENTS

Figures 6, 7:
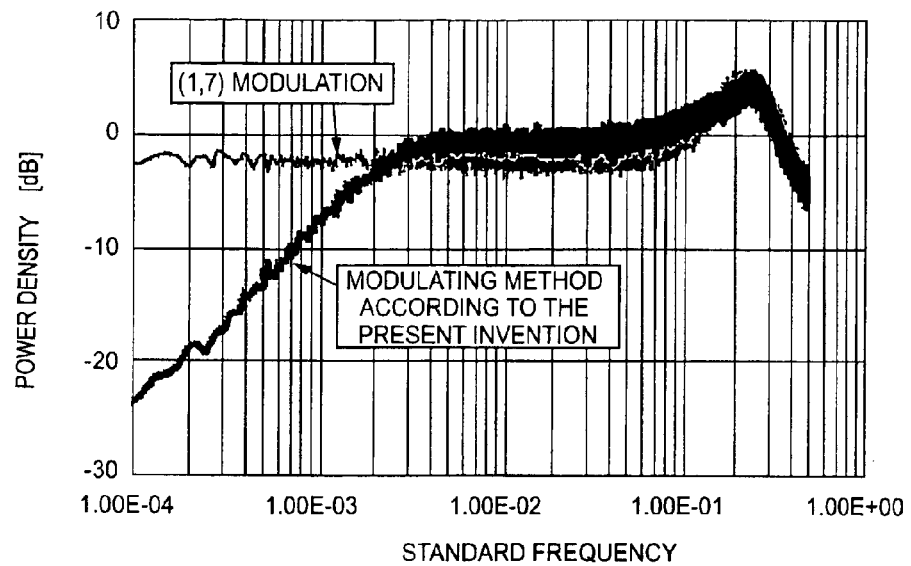
FIG. 6 is a graph showing a frequency characteristic of a code.
FIG. 7 is a diagram showing a synchronization pattern for the modulating method according to the present invention.

To clarify the above and other objects, features, and advantages according to the present invention, embodiments of the present invention will be described in detail with reference to the attached drawings.

FIGS. 1 to 4 show code conversion tables for use in a code modulating method according to the first embodiment of the present invention. In FIGS. 1 to 4, data words of 8 bits 00 to FF are expressed by hexadecimal representations together with corresponding code words of twelve (12) channel bits and next or subsequent states represented by S0 to S2. In each figure, the above-mentioned data words, the code words, and the next states are collectively illustrated in the form of the tables. From this fact, it is readily understood that the code modulation according to the present invention is for modulating the data words of eight (8) bits into the channel bits of twelve (12) bits and carries out eight to twelve (8/12) modulation of the encoding rate (2/3).

Specifically, the three code conversion tables illustrated in each of FIGS. 1 to 4 are used in the current states S0, S1, and S2, respectively. It is to be noted that the code words of the 12 channel bits shown in the code conversion tables include symbols "*" and "#" in addition to "0" and "1". The symbol "*" is a concatenation bit used on concatenation of two code words and takes "0" and "1" when a leading bit of a subsequent code word takes "1" and "0", respectively. The symbol "#" is a DSV control bit and optionally or selectively takes "0" and "1" in accordance with the value of the DSV obtained from the channel bit train produced by a concatenation of the code words.

The three code conversion tables concerned with the states S0 to S2 shown in FIGS. 1 to 4 are successively selected in accordance with the next state shown in the code conversion tables to produce the channel bit train obtained by a concatenation of the code words. Among the channel bit train thus obtained, no continuous data "1" appears and the run length indicating the number of continuous occurrence of data "0" is always kept to 10 or less. Thus, the data "1" does not continuously appear in the channel bit train and the mark or space length produced upon the NRZI conversion on recording the channel bit train has always a length not shorter than 2T (symbol T denotes a channel bit length). That is, it is readily understood that the code conversion tables shown in FIGS. 1 to 4 complies with the RLL (1, 10) rule having the maximum run length 10. As a consequence, it is possible to avoid occurrence of the mark or space which is shorter than 2T and which makes the recording and detection difficult. The above-mentioned conditions are maintained by using the code conversion tables shown in FIGS. 1 to 4 even when the DSV control bit takes either "0" or "1".

Further, concatenation rules illustrated in FIG. 5A are used to concatenate or replace code words. According to the concatenation rules, it is possible to exclude, from the channel bit train, a pattern, such as "1010101010101" which repeats and continues six or more times of the run length 1.

The pattern of the run length 1 is recorded as a mark or a space with a shortest length of 2T when the channel bit train is subjected to NRZI conversion. The continuous repeat times of the run length 1 are restricted to five times at maximum. It is possible to prevent a low amplitude state from being continued on reproduction. The illustrated concatenation rules are used to concatenate two continuous code words and define rules of replacing the code word matched with a predetermined bit train by a code word different in bit series from the former.

Referring to FIG. 5A, the concatenation rules are shown and are applied to the code words obtained by the code conversion tables after the concatenation bit "*" is fixed to "0" or "1". In FIG. 5A, symbol "X" shown in the previous code words before replacement represents that the bit corresponding to "X" may take either one of "0", "1", "#", and "*". The bit position corresponding to "X" is held at a value before replacement and is therefore kept unchanged. The channel bit train replaced on the basis of the concatenation rules include all the patterns that may possibly appear six or more repeat times of run length 1 in the concatenated code words. According to the concatenation rules, the channel bit train can be replaced by any other patterns that can not be obtained from the word codes in the code conversion tables. Concatenation of code words shall be applied at preceding concatenation point first. Concatenation rules illustrated in FIG. 5A shall be applied in order of index or rule number at each concatenation point. Some code word may be replaced 2 times to connect with the previous code word and with following or subsequent code word.

With the code conversion tables shown in FIGS. 1 to 4 and the concatenation rules shown in FIG. 5A, the channel bit train is obtained which has the encoding rate of ⅔, the minimum run length value of 1, the maximum run length value of 10. The repeat times of the run length 1 of the channel bit train is restricted to 5 or less. When the channel bit train is subjected to NRZI conversion and is recorded as data, the conditions are satisfied such that the mark and space length is 2T or more and 11T or less and the continuous repetition of the mark and space of 2T is restricted to 5 times or less. In an area having the continuous marks or spaces of 2T, the amplitude of the reproduction signal is not sufficiently obtained and therefore the data is erroneously detected. The occurrence of the pattern causing the error to occur can be suppressed by limiting the continuous times of the 2T pattern to five or less.

If the continuous appearance of the 2T pattern is restricted to five or less, the mark or space length can be limited to 10T or less even when the 2T pattern continuously appears. In the PRML detection, the entire continuous 2T pattern is shifted by 1T and liable to bring about an error due to the 1T shift. However, if the number of the continuous 2T patterns is restricted to 5 or less, such an influence due to the 1T shift can be suppressed to the 12 channel bits or less. Therefore, an adverse influence over 3 bytes can effectively be avoided even in consideration of the boundary of the code words.

Next, description will be directed to the DSV control bit included in the code conversion tables. In a signal train obtained after the NRZI conversion, the DSV is obtained by summing 1 or (−1) at every channel bit from the leading bit of the channel bit train, when the positive or the negative polarity appears. The DSV serves to indicate the DC component of the code word. As the initial value is assumed to be 0 and the absolute value of the DSV sequentially obtained from the leading bit is close to 0, the DC component is reduced.

According to the code modulating method in the present invention, a value of the DSV control bit "#" in the code words is obtained by referring to the code conversion tables and is determined so that the value of the DSV calculated just before the next DSV control bit in relation to the channel bit train becomes close to 0. FIG. 6 shows an example of a frequency characteristic of the obtained signal after the NRZI conversion under the DSV control. The abscissa denotes the frequency standardized by the channel clock frequency, and the ordinate denotes the power density of the frequency components. Referring to FIG. 6, the amplitude component of random data modulated according to the above method indicates the maximum value at the frequency equal to approximately ¼ of the channel clock frequency. On the contrary, obviously, the amplitude component indicates a low amplitude equal to or lower than the maximum value by 20 dB or more, at the frequency equal to or less than that of 1/10,000 of the channel clock. The frequency band equal to or less than 1/10,000 of the channel clock corresponds to a servo control band for controlling a position of an optical head. The amplitude strength in the frequency band is reduced by 20 dB or more from the maximum value, thereby suppressing the harmful influence given to a servo control signal. Advantageously, the precision for the position control is maintained.

It is guaranteed that the DSV control bit "0" or "1" in the code conversion tables shown in FIGS. 1 to 4 never violates the restriction of the number of the continuous 2T patterns and the run length restriction, irrespective of the code word concatenated before or after the code word. Thus, at the appearance of the DSV control bit, the run length of the channel bit train before/after it does not need to be checked and "0" or "1" is arbitrarily selected as the DSV control bit. The illustrated circuit is simple in structure.

The above description is based on the code conversion tables shown in FIGS. 1 to 4 and the concatenation rules shown in FIG. 5A. However, obviously, the same advantages can be obtained by the use of a modified table of modifying the corresponding relationship between the data word and the code word. All of the patterns replaced under the concatenation rules shown in FIG. 5A do not include any patterns having six or more 2T continuous patterns. Therefore, a part of the replacement can be omitted by detecting the number of the continuous 2T patterns. For example, among the patterns included in the concatenation rules shown in FIG. 5A, only the pattern "1010101010101" that has 6 or more times of the run length 1 may be replaced. Further, the allocation of the DSV control bit is not limited only to the examples in the code conversion tables shown in FIGS. 1 to 4. For example, the code word including the DSV control bit as one bit is separated into two types of the code word having the DSV control bit "0" and the code word having the DSV control bit "1". One of the separated code words may be combined with another code word except for the separated code word and, thereby, the position of the DSV control bit may be changed. The code conversion table obtained by the above operation has the same occurrence frequency of the DSV control bit and therefore can expect the same characteristic as the code conversion tables shown in FIGS. 1 to 4.

In the case of the long channel bit train, it often happens that a demodulation error is caused to occur when the channel clock is put in a disordered state or an asynchronous state. To prevent the demodulation error, a synchronization pattern is usually inserted in the channel bit train. Consequently, even when the synchronization is disordered on reproduction, such a disordered state can be detected upon detecting the next synchronizaton pattern and continuation of the demodulation error is also avoided.

FIG. 7 shows an example of synchronization patterns or codes (may be often abbreviated to SYNC codes later) suitable to the cod modulating method in the present invention. The synchronization patterns or SYNC codes are distinguished from the patterns obtained under the concatenation rules illustrated in FIG. 5A and the code conversion tables shown in FIGS. 1 to 4. This is because each of the SYNC codes shown in FIG. 7 includes a pattern "10000000000001" of a run length 12 (may be denoted by 12-run-length). The illustrated SYNC codes are composed of four SYNC codes or patterns SY0 to SY3 corresponding to the status information or states S0 to S2. As shown in FIG. 7, the same code or pattern is used for the status information S1 and S2. Each SYNC code or pattern is selected on the basis of the status information to be inserted. In the code word just after insertion of the synchronization pattern, the status information is rendered into S1 or S2 and, thereafter, coding operation is continued. In this way, the feature is maintained such that the pattern continuously repeated 6 or more times of the 1-run-length does not appear with the minimum run length value kept at 1, even if the SYNC code is inserted. Although the illustrated SYNC codes include the patterns of the 12-run-length (the run length 12), the SYNC codes may be formed by patterns not smaller than a run length 11 (namely, 11-run-length). This is because such patterns do not appear in usual code words.

In the case of using the SYNC codes or patterns, a concatenation rule or index 10 illustrated in FIG. 5B may be used to concatenate the code word with the SYNC codes so as not to exceed the maximum run length 10. In other words, the concatenation rules as shown in FIG. 5A are not applied to the concatenation between the SYNC codes and the code word and, therefore, the concatenation rule 10 should be applied. As shown in FIG. 5B, the concatenation rule or index 10 includes a predetermined synchronization pattern SY3 which will be described later and which is concatenated as a subsequent or current code word.

Each SYNC code or pattern includes a single DSV control bit. The DSV control bit in the code conversion table is provided for only a part of the code words. Therefore, the DSV control bit might not appear in dependency on the modulating data train. According to the code modulating method in the present invention, the value of the DSV control bit is not determined or fixed until the next DSV control bit appears. Advantageously, the value of the DSV control bit is finally determined at every period of the synchronization pattern, by providing the DSV control bit for each of the SYNC codes.

The four kinds of SYNC codes or patterns SY0 to SY3 are arbitrarily selected and may be regularly selected so as to locate an approximate position of the channel bit train with reference to the detected SYNC code. However, if there is no need for locating the position, the SYNC codes SY0 to SY3 may be selected at random and, alternatively, only the synchronization pattern SY0 may be used. Further, the SYNC codes or patterns are not limited to the illustrated patterns and can have an arbitrary length. Depending on the SYNC codes or patterns, it is possible to modify the SYNC codes together with the status information that is indicative of the code conversion table and that is used just after the synchronization pattern.

Figure 8:
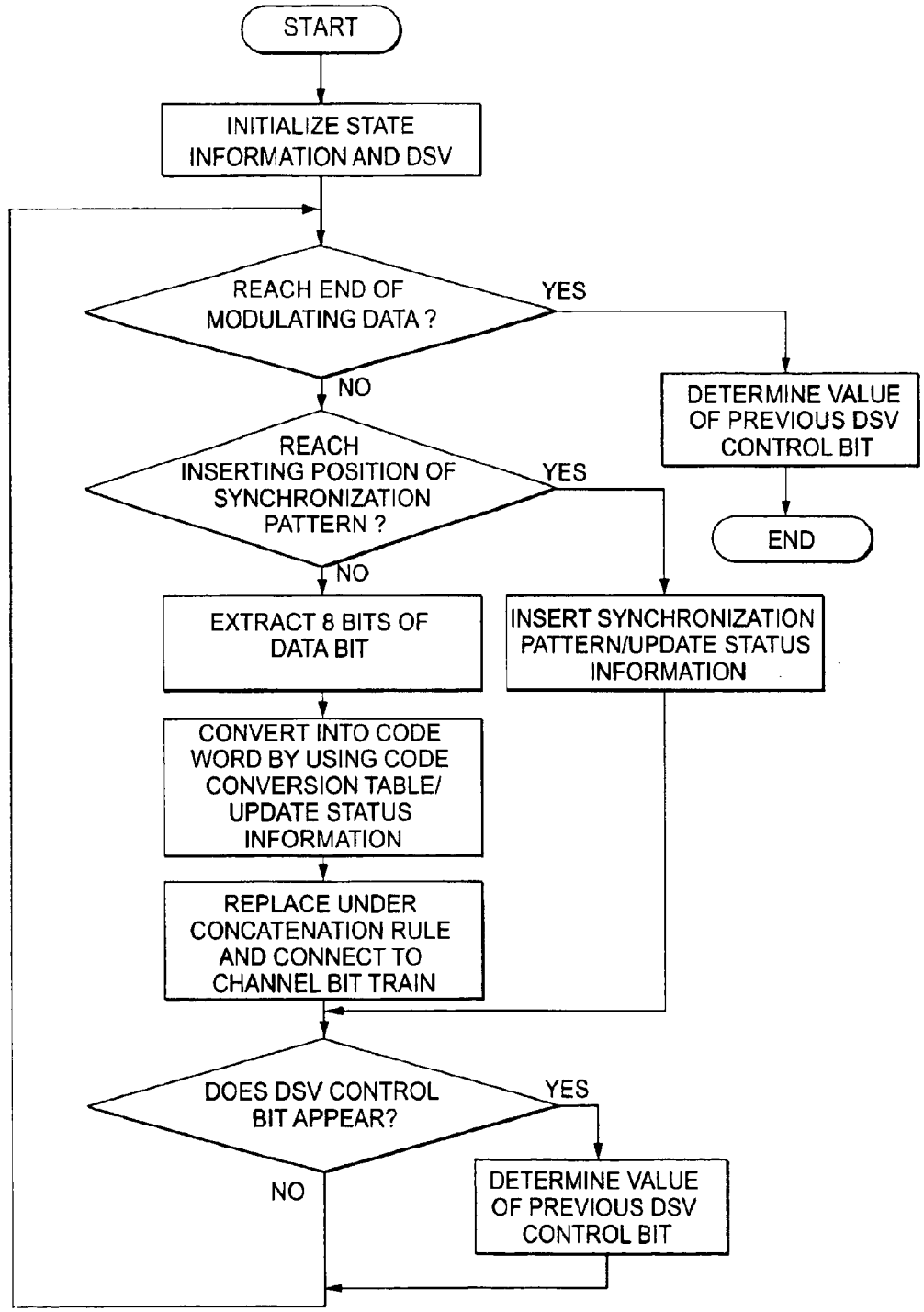
FIG. 8 is a flowchart showing the modulating method according to the present invention.

FIG. 8 shows a flowchart showing the above-mentioned code modulating method. At the beginning of the modulation, the status information is initialized to S1 or S2, and the DSV is initialized to 0. The SYNC codes or patterns are sequentially inserted in the order of the synchronization patterns SY0, SY1, SY2, and SY3 at the heads of data frames obtained by separating the data at a constant byte (e.g., 91 bytes). In this event, the position just after the start of modulation corresponds to a position of inserting the SYNC code or pattern SY0. The synchronization pattern SY0 is selected corresponding to the status information (state) S1 or S2. After inserting the synchronization pattern, the status information is updated to S1 or S2. The synchronization pattern includes the DSV control bit after inserting the synchronization pattern. However, before updating the status information, the synchronization pattern does not include the DSV control bit and therefore the bit is not determined.

Subsequently, the data bits are successively extracted by 8 bits up to the position for inserting the next synchronization pattern and the extracted data bits are converted into the code word by using the code conversion tables. Further, the status information is updated based on the code conversion tables. Furthermore, the code words are concatenated on the basis of the concatenation rules after the replacement of code words. Since the code word just after inserting the synchronization pattern should be concatenated with a previous synchronization pattern, the concatenation rules of the code words may not be applied. When the code word obtained by using the code conversion tables includes the DSV control bit, a value of the old DSV control bit is determined based on the DSV calculated relative to the channel bit train up to the newly-obtained just-before DSV control bit.

As mentioned above, the synchronization patterns are periodically inserted and the encoding is being advanced. The value of the DSV control bit is not always determined until the next DSV control bit appears. However, at the end of the data, the value of the last DSV control bit is determined based on the DSV calculated relative to the channel bit train up to the end data and then the encoding is completed. If the period for inserting the synchronization pattern is determined as approximate 100 bytes, the frequency characteristic shown in FIG. 6 is obtained without influence of the efficiency reduction due to the pattern insertion. A part of the DSV control bit indicated in the code conversion table or in the synchronization pattern may be used for controlling the polarity of the recording data. The synchronization pattern recorded to the recording disk is limited by using the DSV control bit at the predetermined position.

Figure 9:
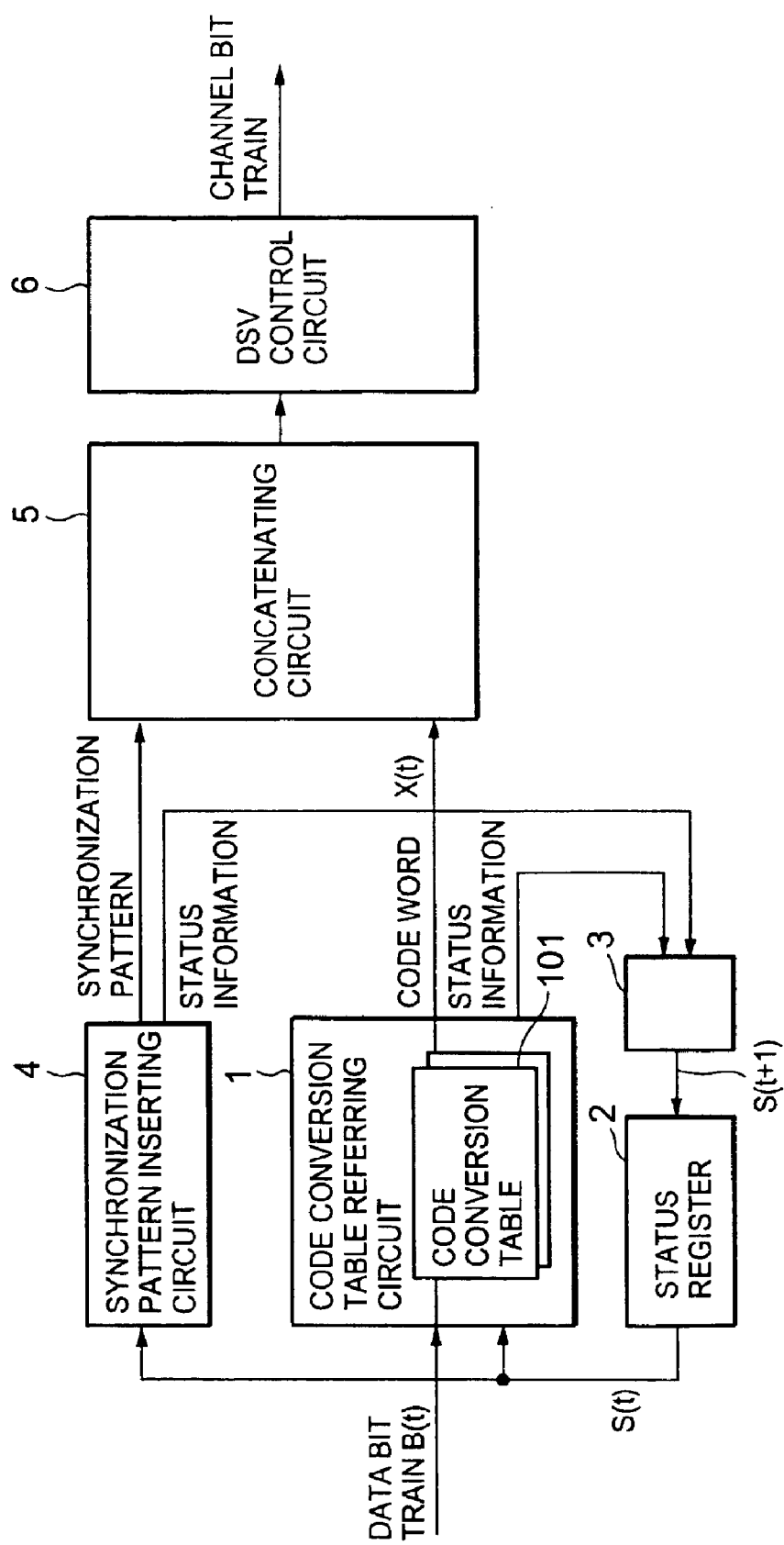
FIG. 9 is a diagram showing the configuration of a modulating circuit according to the present invention.

FIG. 9 shows a modulating circuit used in the code modulating method according to the present invention. The modulating circuit shown in FIG. 9 comprises a code conversion table referring circuit 1, a status register 2, a multiplexer 3, and a synchronization pattern inserting circuit 4. The code conversion table referring circuit 1 comprises code conversion tables 101 shown in FIGS. 1 to 4. The code conversion table referring circuit 1 receives a data train B(t) at every one of 8 bits as well as status information S(t), transmitted from the status register 2. The code conversion table referring circuit 1 refers to the code conversion tables 101 shown in FIGS. 1 to 4 in accordance with the status information S(t), and outputs a code word X(t) having the 12 channel bits. Further, the code conversion table referring circuit 1 outputs the next status information to the multiplexer 3 in accordance with the code conversion table 101. The multiplexer 3 receives the next status information from the synchronization pattern inserting circuit 4, selects it, and outputs the next status information S(t+1) indicating the next status to the status register 2. The status register 2 outputs the status information S(t) corresponding to the next data train B(t) to the code conversion table referring circuit 1 and the synchronization pattern inserting circuit 4.

As mentioned above, the code conversion table referring circuit 1 has a plurality of code conversion tables 101, switches the code conversion tables 101 based on the status information S(t) held by the status register 2, and outputs the code word X(t) corresponding to the given data word and the status information S(t+1) indicating the code conversion table to next be referred to. Further, a connecting circuit, namely, a concatenating circuit 5 is connected to the modulating circuit shown in FIG. 9 at the output terminals of the code conversion table referring circuit 1 and the synchronization pattern inserting circuit 4 and is also connected to a DSV control circuit 6. A channel bit train is outputted from the DSV control circuit 6.

The synchronization pattern inserting circuit 4 outputs the synchronization pattern to be inserted into the channel bit train, based on the status information S(t) held by the status register 2 at a predetermined period, and outputs the status information. The status information outputted from the code conversion table referring circuit 1 and the status information outputted from the synchronization pattern inserting circuit 4 are transmitted to the status register 2 via the multiplexer 3, as mentioned above. The status register 2 works so that the next status information S(t+1) is updated and is held at each time for outputting the code word from the code conversion table referring circuit 1 and at each time for outputting the synchronization pattern from the synchronization pattern inserting circuit 4.

The concatenating circuit 5 operates so as to connect or concatenate both of the code word outputted from the code conversion table referring circuit 1 and the synchronization pattern outputted from the synchronization pattern inserting circuit 4 to produce a concatenated code word. In order to connect or concatenate the code words, the concatenating circuit 5 determines a value of a merging or connecting bit "*" included in the last code word to "0" or "1", and collates the concatenation rule shown in FIG. 5A with the synchronization pattern. When the concatenation rule matches the synchronization pattern, the code word is replaced and the resultant data is outputted as serial data indicating the channel bit train.

The DSV control circuit 6 is responsive to the serial data sent from the concatenating circuit 5 and extracts information indicative of the DSV control bit included in the serial data outputted from the concatenating circuit 5. Further, the DSV control circuit 6 determines the DSV control bit and outputs it as the channel bit train so that the value of the DSV is approximate to 0. With the modulating circuit having the above-mentioned structure, the channel bit train suitable for the high-density recording is obtained without the appearance of the pattern which repeats 6 times or more of 1-run-length. Such a channel bit train so that the low-frequency component is sufficiently small.

Figure 10:
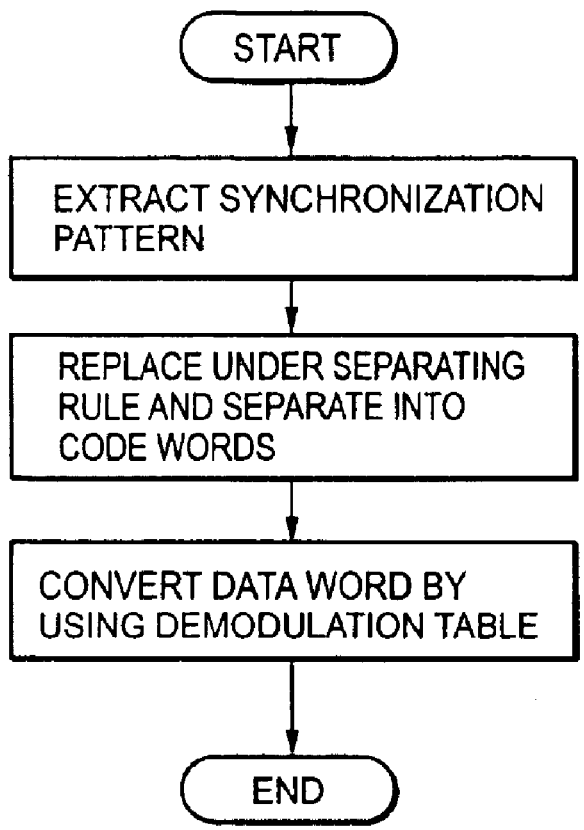
FIG. 10 is a flowchart showing a demodulating method according to the present invention.

Next, description is made about a demodulating method of the channel bit train obtained by both of the encoding modulating method and the encoding modulating circuit according to the present invention. The demodulating method is described with reference to a flowchart of FIG. 10 below. First, the synchronization pattern is extracted from the channel bit train as a result of determining the reproduction signal. The boundary of the code words is specified at every set of 12 channel bits on the basis of the extracted synchronization pattern. Subsequently, detection is made about each pattern that is replaced on the basis of the obtained boundary from the channel bit train by the use of the concatenation rules and that is returned back to a previous code word or pattern prior to the replacement. Thereafter, the pattern is separated into code words. Using the concatenation rules shown in FIG. 5A facilitates detection of the pattern to be reverse-converted and judgment or decision for division of the pattern. The decision is realized by replacing the code words under three separation rules shown in FIG. 11. Next, the data word of 8 bits is obtained as demodulated results by referring to the demodulation table by the use of the code words obtained in the above-mentioned manner. In FIG. 11, reference symbol "x" included in the previous patterns prior to the replacement denotes the bit may take either "1" or "0". The bit corresponding to the reference symbol "x" after the replacement holds the value before the replacement.

FIGS. 12 and 13 show the demodulation tables for obtaining the data word of the eight (8) bits from the code word of the twelve (12) channel bit. Referring to FIGS. 12 and 13, three demodulation tables T0 to T2 are shown. One of the demodulation tables T0 to T2 to be used is selected in consideration of the demodulation target code word, a next code word just after the target code word, and the synchronization pattern. When the next code word following the demodulation target code word is started by the bit "1" or when the next synchronization pattern indicates SY0 to SY2 of the state 0, the demodulation table T0 is used. When the next code word is started by "0000" or when the next synchronization pattern indicates SY3 of the state 0, the demodulation table T1 is used. When the next code word is started by "01", "001", or "0001" or when the synchronization pattern indicates SY0 to SY3 of the states 1 and 2, the demodulation table T2 is used. The value expressed by the hexadecimal notation is obtained as the data word of the 8 bits, in correspondence to the demodulating target code word. When the synchronization pattern exists after as the demodulating target code word, the demodulation table T0 is selected and referred to on occurrence of the synchronization pattern corresponding to the status information S0 while the demodulation table T2 is selected and referred to on occurrence of the synchronization pattern corresponding to the status information S1 or S2. Thus, the data word is produced in the above-mentioned manner.

In the demodulation table, the code word of the channel bit train of 12 bits is made to correspond to the data word of 8 bits. Therefore, it is advantageous that any error is not spread or propagated in the above-mentioned method, as compared with a variable block code produced by the use of conversion tables variable in length This is very effective to suppress the propagation of any error due to restriction of the repeat times of 2T pattern and to reduce an error rate of the data.

In addition, it is noted that there are patterns of channel bits of 12 that are not shown as code words in the tables and the patterns that are designated by the symbol "-" in the columns of the data words. These patterns are not generated in the demodulating method according to the present invention. When these patterns are detected, processing is made as patterns that can not be demodulated. An optional data word is generated together with information that is indicative of a data word including an error. Incidentally, the PRML detection for determining the reproduction signal makes it possible to exclude most of patterns determined as the channel bit train which is not shown in the demodulation table. As a consequence, the errors in the determination and demodulation are further reduced.

Figure 14:
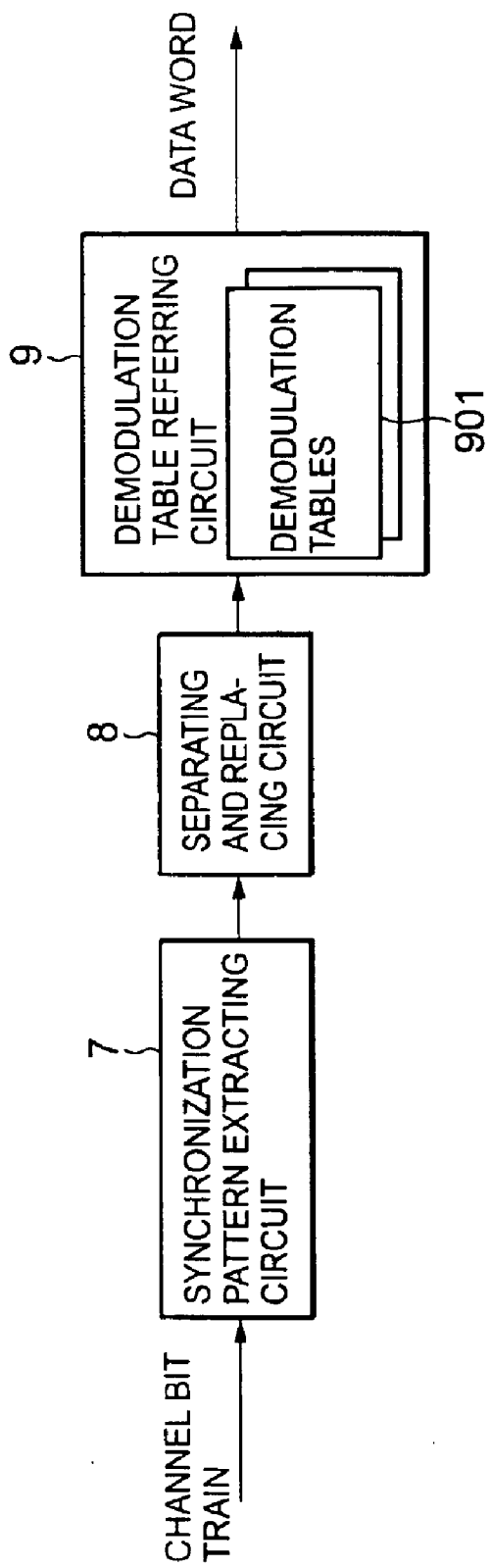
FIG. 14 is a diagram showing the configuration of the demodulating method according to the present invention.

Next, the configuration of the demodulating circuit will be described with reference to FIG. 14. The channel bit train is inputted to a synchronization pattern detecting circuit 7. The synchronization pattern detecting circuit 7 outputs the channel bit train with information indicating the boundary position of the code words with reference to the position of the detected synchronization pattern. Subsequently, a separating and replacing circuit 8 detects and replaces the pattern matching a separation rule shown in FIG. 11, and further separates the channel bit train into the code word and outputs it. A demodulation table referring circuit 9 converts the above-obtained code word train into the data word having the 8 bits and outputs it. In order to demodulate the code word having the 12 channel bits, the demodulation table referring circuit 9 refers to the code word subsequent thereto and synchronization pattern, selects a demodulation table 901, and extracts the data word corresponding to the code word. The demodulation table referring circuit 9 outputs information indicative of impossibility of the demodulation in relation to the code word which does not appear in the demodulation table. In the demodulation, the processing is performed as the unit of the code word of the twelve (12) channel bits and, sufficiently, at least the code word just before/after the demodulation is referred to. Therefore, the circuit structure for preventing the propagation of the demodulating error is realized.

In an optical recording medium in which the channel bit train is obtained according to the code modulating method in the present invention, a signal is obtained by the NRZI conversion of the channel bit train, and the signal is recorded in correspondence to an interval of pits and a pit length. Such recording is characterized in that the channel clock is stably extracted even when recording is carried out with a high recording density and the detection error can be reduced. The reproduction signal obtained from the pits rarely includes components in a servo band and therefore the tracing property of optical pick-up operation for detecting the signal is not deteriorated.

Herein, an optical recording medium according to the present invention will be described in detail. In the optical recording medium in the present invention, the channel bit train is subjected to NRZI conversion and recorded in the optical recording medium in the form of the pit length and the pit interval. Further, in the optical recording medium, the channel bit train is formed, except the synchronization pattern, by patterns which have a minimum run length value as 1 and a maximum run length value as 10 and which prohibit the run length 1 from being repeated six times or more. It is needless to say that the synchronization pattern is inserted at a predetermined period. Further, in the optical recording medium, information is recorded so that frequency components of the signal read from the pits are lower than the maximum value of the frequency components by 20 dB or more as the power density at the frequency of $1/10,000$ or less of the channel clock frequency.

The present invention is not limited to the above embodiments and, obviously, the embodiments of the present invention can appropriately be changed within the spirit of the present invention. For example, the present invention can be applied not only to the reading and writing in the optical recording medium but also to any other recording media.

What is claimed is:

1. A code modulating method of converting a data bit train of 2n (where symbol n denotes an integer) bits into a channel bit train of 3n bits, said code modulating method comprising the steps of:
    converting the data bit train into the channel bit train so that a run length indicative of the number of "0" bits between adjacent ones of "1" bits in the channel bit train has a minimum value 1 and a maximum value 10;
    prohibiting, in the channel bit train, occurrence of a pattern "1010101010101" in which the run length 1 continuously repeated six times or more when any data bit train is modulated; and
    having, in the channel bit train, a DSV (Digital Sum Value) control bit which selectively takes either "0" bit or "1" bit in accordance with a DSV.

2. A code modulating method according to claim 1, a signal being generated by NRZI conversion of the channel bit train obtained when random data is used as the data bit train and having a frequency component, wherein the adding step comprises the step of:
    selecting the value of the DSV control bit in accordance with the DSV so that the frequency component has a power density that is reduced from a maximum value of the frequency component by 20 dB or more at a frequency of $1/10,000$ or less of a channel clock frequency.

3. A code modulating method according to claim 1, wherein a plurality of code conversion tables are provided for making a data word containing the data bit train of eight (8) bits correspond with a code word containing the channel bit train of twelve (12) bits and status information indicative of a selected one of said code conversion tables that is to be referred to upon converting the next data word,
    said code modulating method further comprising the steps of;
    obtaining the code word of the twelve (12) channel bits by separating the data bit train by eight (8) bits and by referring to said code conversion table selected based on the status information; and
    obtaining the channel bit train by replacing a part of the code words under a predetermined replacing rule upon concatenating the code words.

4. A code modulating method according to claim 3, wherein the code word containing the 12 channel bits obtained from said code conversion table has additional information indicative of a merging bit for selecting the "0" bit or "1" bit in accordance with the bit just before/after the code word so that a continuous state of the "1" bits is prohibited upon concatenating the code words.

5. A code modulating method according to claim 1, further comprising:
    inserting, into the channel bit train at a predetermined period, the channel bit train having a predetermined length as a synchronization pattern which includes a pattern such that the run length is not shorter than eleven (11).

6. A code modulating method according to claim 5, further comprising the step of:
    selecting the synchronization pattern obtained by prohibiting occurrence of a pattern such that, in the channel bit train including the synchronization pattern, the minimum value is equal to 1 in the run length and the run length 1 repeats six times or more.

7. A code modulating method according to claim 1, further comprising the step of:
    using said code conversion table in which the data word of the eight (8) bits expressed by hexadecimal notation is made to correspond to the next status information, together with a concatenation rule determined as the replacing rule, based on the correspondence between a precedent code word and a subsequent code word.

8. A demodulating method for demodulating a channel bit train obtained by the code modulating method according to claim 1, said demodulating method comprising the steps of:
    preparing a plurality of demodulation tables which store a data word containing a data bit train of eight (8) bits, in correspondence to the code word containing the channel bit train of the twelve (12) bits;
    detecting a pattern replaced under a replacing rule used in concatenating code words before separating the channel bit train at every code word;

replacing the detected pattern by a previous pattern before the replacement;

separating the previous pattern into the code words containing the channel bit train of the twelve (12) bits;

selecting said demodulation tables for demodulating the separated code words based on information indicative of the subsequent code word of the twelve (12) channel bits; and obtaining the data word containing the data bit train of the eight (8) bits by using information indicating the code word having the twelve (12) channel bits and said selected demodulation table.

9. A code modulating apparatus using a code modulating method according to claim 1, comprising:

means which obtains a code word from status information and a data word containing a data bit train of eight (8) bits by referring to a plurality of code conversion tables, each of said code conversion table storing the code word and status information corresponding to the data word, the code word containing a channel bit train of twelve (12) bits and additional information, the status information indicating said code conversion table to be referred to for converting the next data word, the additional information indicating a DSV control bit for selecting a "0" bit or "1" bit in accordance with a value of a DSV;

means which obtains the channel bit train by replacing a part of the code words under a predetermined replacing rule upon concatenating the code words; and means which calculates the DSV of the obtained channel bit train and determines a value of the DSV control bit indicated by the additional information.

10. A code modulating apparatus according to claim 9, wherein the code word having the 12 channel bits obtained from said code conversion table includes additional information indicating a merging bit for selecting "0" or "1" in accordance with the bit just before/after the code word having the 12 channel bits so that a continuous state of the "1" bits is prohibited upon concatenating the code words, and a value of the merging bit indicated by the additional information is determined upon concatenating the code words; and means which calculates the DSV of the obtained channel bit train and determines the value of the DSV control bit indicated by the additional information.

11. A code modulating apparatus according to claim 9, further comprising:

means which uses, as a synchronization pattern, the channel bit train with a predetermined length, including a pattern equal to or longer than an eleven and a DSV control bit for selecting "0" or "1" in accordance with a value of the DSV and which inserts the synchronization pattern into the channel bit train at a predetermined period and modulates it.

12. A demodulating apparatus for demodulating a channel bit train obtained by a code modulating method according to claim 5, said demodulating apparatus comprising:

a plurality of demodulation tables for storing a data word containing a data bit train of eight (8) bits corresponding to the code word containing the channel bit train of twelve (12) bits;

means which detects an inserted synchronization pattern from the channel bit train;

means which further detects a pattern replaced under a replacing rule upon concatenating the code words before separating the channel bit train every code word, replaces the detected pattern with a pattern before the replacement, and separates the pattern into the code word containing the channel bit train of the 12 bits;

means which selects said demodulation tables for demodulating the separated code word based on information indicating the subsequent code word of the twelve (12) channel bits; and means which obtains the data word containing the data bit train having the 8 bits by using information indicative of the code word of the 12 channel bits and said selected demodulation table.

13. An information recording medium recording information that is obtained by NRZI conversion of a channel bit train and that is made to correspond to a pit length and a pit interval, wherein the information is recorded so that a run length in the channel bit train has a minimum value 1 and a maximum value 10 except for a synchronization pattern inserted at a predetermined period, the appearance of a pattern such that the run length 1 which is continuously repeated six times or more is prohibited in the channel bit train;

a frequency component of a signal recorded from a pit having a power density which is reduced from a maximum value of the frequency component by 20 dB or less at a frequency of $1/10,000$ or less of a channel clock frequency.

14. A signal converting method comprising the steps of:

converting a data bit train into a channel bit train so that a run length indicative of the number of "0" bits between adjacent ones of "1" bits in the channel bit train has a minimum value 1 and a maximum value 10; and prohibiting, in the channel bit train, the appearance of a pattern such that the run length 1 is continuously repeated six times or more upon modulating any data bit train.

* * * * *